United States Patent
Lee et al.

(10) Patent No.: US 10,198,176 B2
(45) Date of Patent: Feb. 5, 2019

(54) METHOD OF MANAGING ONE OR MORE NOTIFICATIONS AND ELECTRONIC DEVICE FOR SAME

(71) Applicant: Samsung Electronics Co., Ltd., Suwon-si, Gyeonggi-do (KR)

(72) Inventors: Jae-Ho Lee, Daegu (KR); Kyu-Chul Kong, Gumi-si (KR); Hye-Soon Jeong, Chilgok-gun (KR); Hyun-Suk Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 15/054,865

(22) Filed: Feb. 26, 2016

(65) Prior Publication Data

US 2016/0253089 A1    Sep. 1, 2016

(30) Foreign Application Priority Data

Feb. 27, 2015    (KR) ................. 10-2015-0028654

(51) Int. Cl.
| | | |
|---|---|---|
| *G06F 3/0488* | (2013.01) | |
| *G06F 3/0481* | (2013.01) | |
| *G06F 3/0484* | (2013.01) | |
| *G06F 9/54* | (2006.01) | |
| *H04M 19/04* | (2006.01) | |

(52) U.S. Cl.
CPC ........ *G06F 3/04883* (2013.01); *G06F 3/0488* (2013.01); *G06F 3/04817* (2013.01); *G06F 3/04842* (2013.01); *G06F 9/542* (2013.01); *H04M 19/04* (2013.01)

(58) Field of Classification Search
None
See application file for complete search history.

(56) References Cited

U.S. PATENT DOCUMENTS 8,924,894 B1* 12/2014 Yaksick .............. G06F 3/04886
715/863
9,274,741 B2* 3/2016 Moon ................... G06F 3/0416
(Continued)

FOREIGN PATENT DOCUMENTS

KR    10-2011-0093630 A    8/2011
KR    10-2012-0022407 A    3/2012
(Continued)

*Primary Examiner* — Amare Mengistu
*Assistant Examiner* — Sarvesh J Nadkarni
(74) *Attorney, Agent, or Firm* — Jefferson IP Law, LLP

(57) ABSTRACT

A method for displaying information by an electronic device is provided. The method includes displaying a first information display area on a touch screen in response to a first user input received through a first part in some areas of the touch screen including the first part and a second part connected or adjacent to the first part, displaying a second information display area on the touch screen in response to a second user input received through the second part, displaying first information received from outside of the electronic device in the first information display area, the first information being associated with first contact information, and displaying second information received from the outside of the electronic device in the second information display area, the second information being associated with second contact information.

18 Claims, 19 Drawing Sheets

(56) References Cited

U.S. PATENT DOCUMENTS

| | | | |
|---|---|---|---|
| 9,337,434 B2* | 5/2016 | Lindblad | H01L 51/52 |
| D777,130 S * | 1/2017 | Kim | D14/138 G |
| D777,698 S * | 1/2017 | Kim | D14/138 G |
| D778,313 S * | 2/2017 | Cho | D14/487 |
| D778,869 S * | 2/2017 | Kim | D14/138 G |
| 9,651,989 B2* | 5/2017 | Kim | G06F 3/0487 |
| 9,710,161 B2* | 7/2017 | Ryu | G06F 3/04883 |
| 2008/0174570 A1* | 7/2008 | Jobs | G06F 3/0488 345/173 |
| 2008/0189657 A1* | 8/2008 | Kim | G06F 3/0485 715/810 |
| 2009/0228820 A1* | 9/2009 | Kim | G06F 3/04817 715/769 |
| 2009/0265628 A1* | 10/2009 | Bamford | G06F 3/0482 715/702 |
| 2010/0053861 A1* | 3/2010 | Kim | H04M 1/22 361/679.01 |
| 2010/0207844 A1 | 8/2010 | Manning | |
| 2011/0087970 A1* | 4/2011 | Swink | H04L 51/32 715/752 |
| 2011/0231478 A1* | 9/2011 | Wheeler | G06F 17/30864 709/203 |
| 2012/0084647 A1* | 4/2012 | Homma | G06F 3/0483 715/273 |
| 2012/0117507 A1* | 5/2012 | Tseng | H04M 1/72552 715/774 |
| 2012/0302167 A1* | 11/2012 | Yun | G06F 3/04883 455/41.2 |
| 2013/0002133 A1* | 1/2013 | Jin | H01L 51/5253 313/511 |
| 2013/0033434 A1* | 2/2013 | Richardson | G06F 3/0488 345/173 |
| 2013/0145311 A1* | 6/2013 | Joo | G06F 3/04886 715/788 |
| 2013/0178248 A1* | 7/2013 | Kim | H04M 1/0268 455/566 |
| 2013/0300697 A1* | 11/2013 | Kim | G06F 1/1626 345/173 |
| 2014/0118271 A1* | 5/2014 | Lee | G06F 3/0488 345/173 |
| 2014/0164972 A1* | 6/2014 | Lee | G06F 3/0485 715/772 |
| 2014/0267091 A1* | 9/2014 | Kim | G06F 1/1652 345/173 |
| 2014/0282222 A1* | 9/2014 | Eim | G06F 3/04842 715/783 |
| 2014/0333550 A1* | 11/2014 | Yang | G06F 1/3259 345/173 |
| 2015/0015513 A1 | 1/2015 | Kwak et al. | |
| 2015/0288795 A1* | 10/2015 | Park | G06F 3/0485 455/566 |

FOREIGN PATENT DOCUMENTS

| | | |
|---|---|---|
| KR | 10-2012-0082154 A | 7/2012 |
| KR | 10-2014-0113799 A | 9/2014 |

* cited by examiner

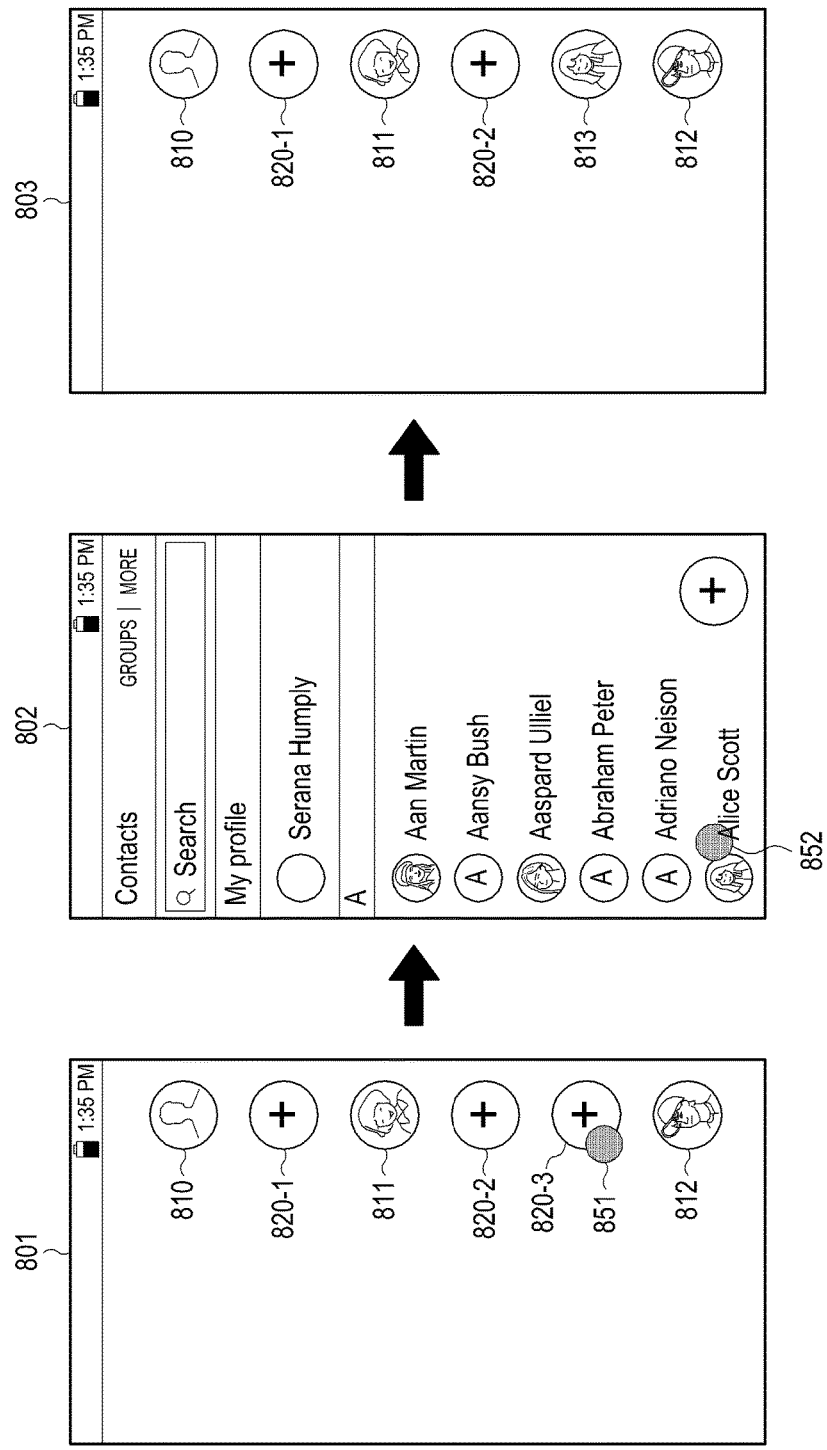

| | when number of pieces of notification data is 1 | when number of pieces of notification data is two or more |
|---|---|---|
| missed call | Jennifer Owen 12:46 AM<br>Missed call | Jennifer Owen 12:46 AM<br>3 missed calls |
| message | Jennifer Owen 12:46 AM<br>Did you get my message? I'm on my way now. See you in 5 mins. | Jennifer Owen 12:46 AM<br>3 message |
| email | Jennifer Owen 12:46 AM<br>[Urgent] UX meeting notice(4pm) Hello all, this is Jennifer Owen. | Jennifer Owen 12:46 AM<br>3 new emails |
| external electronic device | Jennifer Owen 12:46 AM<br>Received 32 Music files. | Jennifer Owen 12:46 AM<br>Shared 3 times |

| user | type | data |
|---|---|---|
| Hong Gil Dong R | phone number 1 | 010-7411-2145 |
| | . . . | |
| | . . . | |
| | nickname | Silver |
| | Email | |

| user | type | data |
|---|---|---|
| Hong Gil Dong | phone number 1 | 010-7411-2145 |
| | . . . | |
| | . . . | |
| | nickname | Silver |
| | Email | asd@gmail.com |

| user | type | data |
|---|---|---|
| Hong Gil Dong | phone number 1 | 010-8145-2145 |
| | phone number 2 | 010-7411-2145 |
| | . . . | |
| | nickname | |
| | Email | |

| user | type | data |
|---|---|---|
| Hong Gil Dong | phone number 1 | 010-8145-2145 |
| | phone number 2 | 010-7411-2145 |
| | ... | |
| | nickname | Silver |
| | Email | asd@gmail.com |

1120

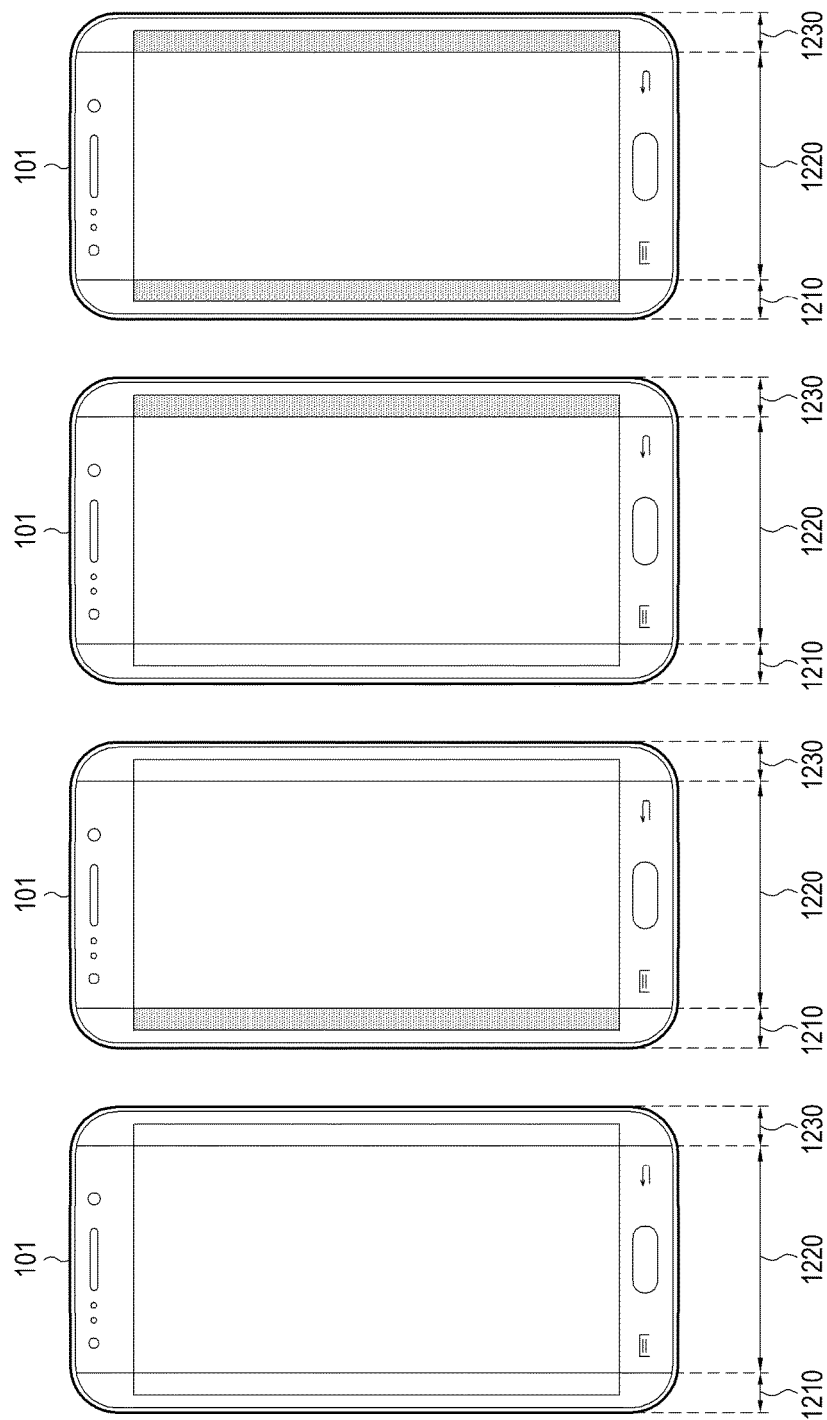

METHOD OF MANAGING ONE OR MORE NOTIFICATIONS AND ELECTRONIC DEVICE FOR SAME

CROSS-REFERENCE TO RELATED APPLICATION(S)

This application claims the benefit under 35 U.S.C. § 119(a) of a Korean patent application filed on Feb. 27, 2015 in the Korean Intellectual Property Office and assigned Serial No. 10-2015-0028654, the entire disclosure of which is hereby incorporated by reference.

TECHNICAL FIELD

The present disclosure relates to an electronic device for classifying one or more notifications according to each target registered in contacts or each application and providing the classified notifications to a user.

BACKGROUND

With advances in technology, an electronic device is now able to integrate and support various user functions such as photographing an image, reproducing multimedia, playing a game, receiving a broadcast, and the like. As functions of the electronic device are diversified, the electronic device also supports a notification service that informs the user of generation of a particular event.

The term "notification" refers to an event that provides a notification to the user at a predetermined time or when the electronic device receives a message. The notification service may include a notification of an event such as an alarm, a schedule, an incoming call, a short message service (SMS), an e-mail, or a voice mail when the event is generated or received by the electronic device.

The above information is presented as background information only to assist with an understanding of the present disclosure. No determination has been made, and no assertion is made, as to whether any of the above might be applicable as prior art with regard to the present disclosure.

SUMMARY

However, an electronic device is not able to manage notifications according to each target registered as a contact in the electronic device or does not classify notifications according to each registered target to provide the notifications to the user. The user can identify notifications according to each application by which the notification is generated but cannot identify all notifications at once regardless of the type of application or cannot identify notifications according to each application corresponding to a target registered as a contact. Further, the user cannot preferentially identify a notification related to a particular registered target among the targets registered in the contacts. In addition, the user cannot manage a notification generated in an external electronic device connected to the electronic device.

Aspects of the present disclosure are to address at least the above-mentioned problems and/or disadvantages and to provide at least the advantages described below. Accordingly, an aspect of the present disclosure is to provide a method of classifying notifications according to each target registered as a contact or each application and providing the classified notifications to a user, and an electronic device for the same.

In accordance with an aspect of the present disclosure, a method for displaying information by an electronic device is provided. The method includes displaying a first information display area on a touch screen in response to a first user input received through a first part in some areas of the touch screen including the first part and a second part connected or adjacent to the first part, displaying a second information display area on the touch screen in response to a second user input received through the second part, displaying first information received from outside of the electronic device in the first information display area, the first information being associated with first contact information, and displaying second information received from the outside of the electronic device in the second information display area, the second information being associated with second contact information.

In accordance with another aspect of the present disclosure, an electronic device is provided. The electronic device includes a display comprising a touch screen, and a processor configured to control the display to display a first information display area on a touch screen in response to a first user input received through a first part in some areas of the touch screen including the first part and a second part connected or adjacent to the first part, control the display to display a second information display area on the touch screen in response to a second user input received through the second part, control the display to display first information received from outside of the electronic device in the first information display area, the first information being associated with first contact information, and control the display to display second information received from the outside of the electronic device in the second information display area, the second information being associated with second contact information.

According to various embodiments of the present disclosure, a method of classifying notifications according to each target registered in contacts or each application and providing the classified notifications to a user, and an electronic device for the same can be provided.

An electronic device according to various embodiments of the present disclosure can classify one or more notifications according to each target registered in contacts and provide the classified notifications to a user who uses the electronic device.

Further, an electronic device according to various embodiments of the present disclosure can provide notifications classified according to each registered target or each application through an integration notification user interface (UI) to the user. An electronic device can provide the user with an integration notification UI through which the user can easily perform an operation related to an event by which a notification is generated, for example, easily identify a message, write a response, identify a missed call, or make a call to the corresponding contact.

An electronic device according to various embodiments of the present disclosure can preferentially provide the user with notifications related to a particular contact preset by the user or preset to the electronic device among the contacts through the integration notification UI.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A to 8C illustrate an example of configuring a target to be managed by priority in an electronic device by the user and of an integration notification UI displayed by the electronic device according to various embodiments of the present disclosure;

FIG. 9 illustrates an example of an integration notification UI displayed by an electronic device according to various embodiments of the present disclosure;

FIGS. 11A to 11D illustrate an example of storing contacts by an electronic device according to various embodiments of the present disclosure;

FIGS. 12A to 12E illustrate an electronic device according to various embodiments of the present disclosure;

Throughout the drawings, it should be noted that like reference numbers are used to depict the same or similar elements, features, and structures.

DETAILED DESCRIPTION

Figure 1:
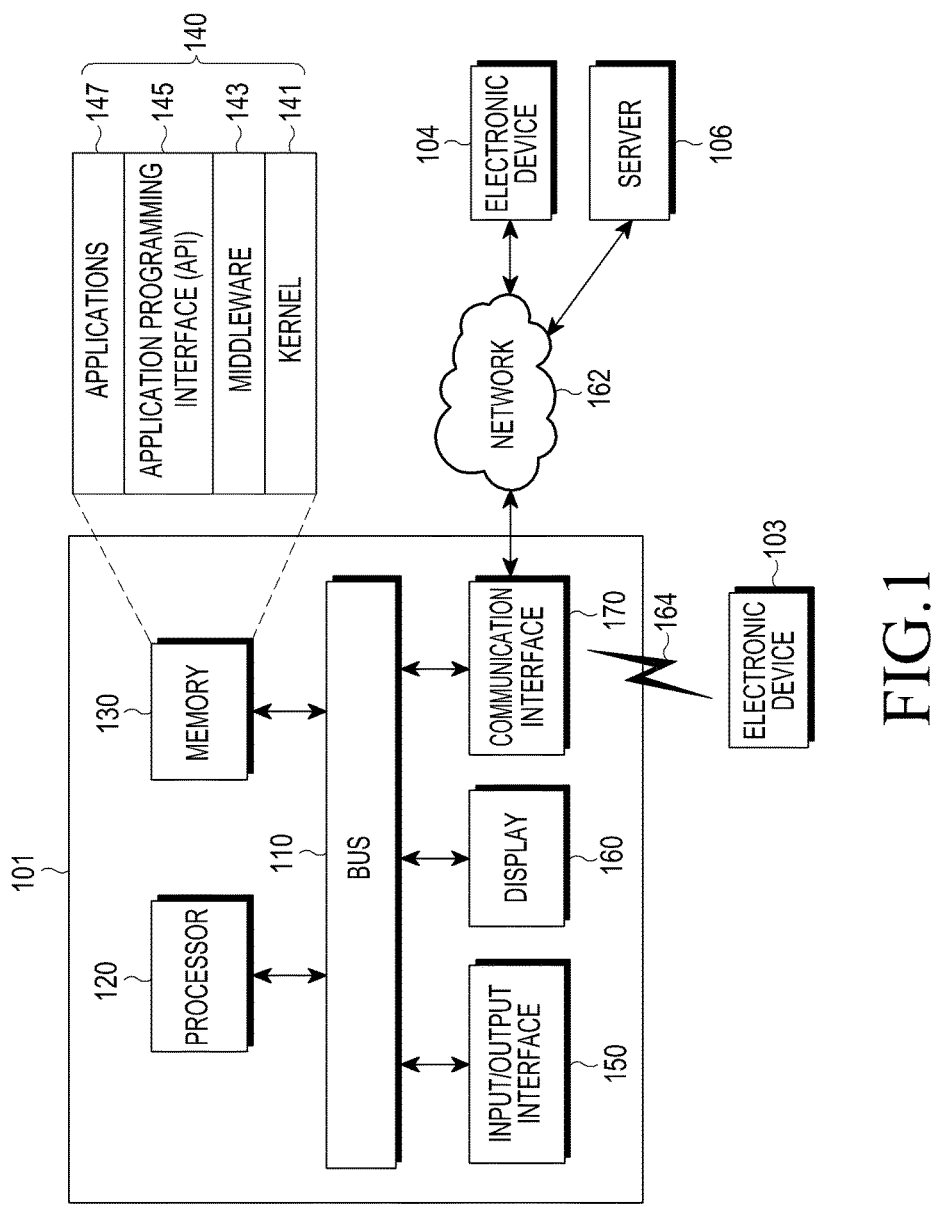
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expressions "have", "may have", "include" or "may include" refer to the existence of a corresponding feature (e.g., numerical value, function, operation, or components such as elements), and do not exclude existence of additional features.

In the present disclosure, the expressions "A or B", "at least one of A or/and B", or "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B.

The expressions "a first", "a second", "the first", or "the second" used in various embodiments of the present disclosure may modify various components regardless of the order and/or the importance but do not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e g, third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

Unless defined otherwise, all terms used herein, including technical terms and scientific terms, have the same meaning as commonly understood by a person of ordinary skill in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, and a wearable device. According to various embodiments of the present disclosure, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to various embodiments of the present disclosure, the electronic device may be a home appliance. The home appliance may include at least one of, for example, a television (TV), a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to an embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, a point of sales (POS) in a shop, or an internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

Referring to FIG. 1, an electronic device 101 may include at least one of a bus 110, a processor 120, a memory 130, an input/output interface 150, a display 160, and a communication interface 170. In various embodiments of the present disclosure, the electronic device 101 may omit at least some of the above components or further include other components.

The bus 110 may include a circuit for connecting the components 120, 130, and 150 to 170 and transmitting communication between the components 120, 130, and 150 to 170 (for example, control messages and/or data).

The processor 120 may include one or more of a CPU, an AP, and a communication processor (CP). For example, the processor 120 may carry out operations or data processing related to control and/or communication of at least one other element of the electronic device 101.

According to an embodiment of the present disclosure, the processor 120 may generate notification data for informing of events (for example, reception of a message or mail, generation of a missed call log, connection with an external electronic device, and the like) generated by applications (or files) installed in the electronic device 101. The generation of the notification data refers to a notification event. According to an embodiment of the present disclosure, the notification data may be generated by an application by which the event is generated.

For example, when a message is received, notification data for informing of the reception of the message may be generated by the processor 120 or generated by an application by which the message is received. According to an embodiment of the present disclosure, when an event is generated by an application, the application may generate notification data for informing of the generation of the event and transfer the notification data to the processor 120.

According to an embodiment of the present disclosure, the processor 120 may analyze the notification data and determine information on the event, for example, the application by which the event is generated, a registered target associated with the event, and information on an item related to the event. The registered target may indicate, for example, a person (or object) of which a name, nickname, phone number, or mail address is registered in contacts of the electronic device 101. The item may include, for example, a phone number, a schedule, an alarm, a message (short message service (SMS) or multimedia message service (MMS)), an email, a voice mail, a media file, and the like.

The information on the item may include a time when the corresponding item is received, a capacity of the corresponding item, the content of the corresponding item (for example, the content of mail, the content of a message, the content of a schedule, and the like), etc.

For example, it may be assumed that a message is received from a target with the name "Noel", which is registered in the contacts. An application may receive the message and generate notification data for informing of the reception of the message. The processor 120 may analyze the notification data and determine that the notification data is for informing of the "message reception" by the "application" and that the message is received from the registered target "Noel."

According to an embodiment of the present disclosure, the processor 120 may classify the notification data generated by respective applications according to each application. For example, it may be assumed that there are three pieces of notification data corresponding to a message application, two pieces of notification data corresponding to a mail application, and one piece of notification data corresponding to a call application. For example, the processor 120 may provide the user with notification data on different applications at once by controlling the display 160 to display "message: 3, mail: 2, and call: 1" on a home screen of the electronic device 101.

According to an embodiment of the present disclosure, the processor 120 may classify the notification data generated by respective applications according to each registered target related to each of the corresponding events. The processor 120 may classify the notification data by respective applications according to each registered target as shown in, for example, Table 1 below. Referring to Table 1, it may be assumed that the electronic device 101 stores contacts in which A, B, C, and D are registered as the targets and applications Appl-01, Appl-02, Appl-03, and Appl-04 are installed in the electronic device 101.

TABLE 1

|   | Appl-01 | Appl-02 | Appl-03 | Appl-04 |
|---|---------|---------|---------|---------|
| A | Noti-01 | Noti-02, Noti-03 | Noti-04 | Noti-05 |
| B | None | Noti-06, Noti-07, Noti-08 | Noti-09 | None |
| C | Noti-10 | Noti-11 | None | Noti-12, Noti-13 |
| D | None | None | None | Noti-14 |

In Table 1, Noti-01 to Noti-14 correspond to notification data by Appl-01, Appl-02, Appl-03, and Appl-04. Referring to Table 1, with respect to the registered target A, one piece of notification data Noti-01 is generated in Appl-01, two pieces of notification data Noti-02 and Noti-03 are generated in Appl-02, one piece of notification data Noti-04 is generated in Appl-03, and one piece of notification data Noti-05 is generated in Appl-04. With respect to the registered target B, no notification data is generated in Appl-01, three pieces of notification data Noti-06, Noti-07, and Noti-08 are generated in Appl-02, one piece of notification data Noti-09 is generated in Appl-03, and no notification data is generated in Appl-04. With respect to the registered target C, one piece of notification data Noti-10 is generated in Appl-01, one piece of Noti-11 is generated in Appl-02, no notification data is generated in Appl-03, and two pieces of notification data Noti-12 and Noti-13 are generated in Appl-04. With respect to the registered target C, no notification data is generated in Appl-01, Appl-02, and Appl-03, and one piece of notification data Noti-14 is generated in Appl-04. The processor 120 may classify and manage the notification data generated in the electronic device 101 according to each application with respect to each registered target as shown in Table 1.

According to an embodiment of the present disclosure, each application may transfer the notification data to the processor 120. The processor 120 may transmit (or broadcast) the notification data to all applications installed in the electronic device 101.

According to an embodiment of the present disclosure, the processor 120 may assign a priority to each of the registered targets to manage the notification data with respect to each of the registered targets. The priority may be determined according to a user input through the input/output interface 150. According to an embodiment of the present disclosure, the priority may be determined according to an event occurrence frequency related to the registered target. For example, the processor 120 may give a higher priority to a registered target having a high related event occurrence frequency rather than a registered target having a relatively low related event occurrence frequency. The priority is an element which can be fluidly changed, and thus may be designated to one or more of the contacts stored in the electronic device 101 or changed according to a condition preset by the electronic device or a user selection.

According to an embodiment of the present disclosure, the priority may be determined according to a communication time with the registered target. For example, the processor 120 may give a higher priority to a registered target having a long communication time with the registered target rather than a registered target having a relatively short communication time. The communication time with the registered target may be a time during which the user of the electronic device 101 exchanges messages or mail through the electronic device 101, makes a phone call, plays a game, or shares an application or file with the registered target. The processor 120 may record the communication time with each of the registered targets according to each application or each registered target in the memory 130 and calculate an accumulated time. The processor 120 may determine a priority of the corresponding registered target according to a length of the accumulated time.

According to an embodiment of the present disclosure, the processor 120 may control the display 160 to display notification data according to the priority. For example, it may be assumed that there are registered targets A and B which are registered in the contacts. If the user gives a higher priority to A rather than B, the processor 120 may control the electronic device 101 to display notification data for A in preference to notification data for B, so as to inform the user of the notification data. For example, it may be assumed that first notification data for A is generated at 10:15 and second notification data for B is generated at 14:10. If priorities of the registered targets A and B are equal, the processor 120 may control the display 160 to first display the second notification according to an inverse order of the generation time of the notification data. However, if the priority of the registered target A is higher than that of the registered target B, the processor 120 may control the display 160 to display the first notification data for A in preference to the second notification data for B even though the second notification data is generated later than the first notification data.

According to an embodiment of the present disclosure, the processor 120 may assign a priority to each application to manage the notification data with respect to each application. The priority may be determined according to a user input through the input/output interface 150. According to an embodiment of the present disclosure, the priority may be determined according to an occurrence frequency of the event generated by the application. For example, the processor 120 may give a higher priority to an application having a high event occurrence frequency rather than an application having a relatively low event occurrence frequency.

According to an embodiment of the present disclosure, the processor 120 may control the display 160 to display notification data according to the priority. For example, it may be assumed that applications Appl-01 and Appl-02 are installed in the electronic device 101. If the user gives a higher priority to Appl-02 rather than Appl-01, the processor 120 may control the electronic device 101 to display notification data for Appl-02 in preference to notification data for Appl-01, so as to inform the user of the notification data. For example, it may be assumed that first notification data for Appl-01 is generated at 18:15 and second notification data for Appl-02 is generated at 14:10. If the priority of Appl-02 is higher than the priority of Appl-01, the processor 120 may control the display 160 to display the second notification data in preference to the first notification data.

According to an embodiment of the present disclosure, when the electronic device 101 is connected to an external electronic device (for example, an electronic device 103 or 104), the processor 120 may manage events in applications installed in the external electronic device and notification data for informing generation of the events. When the events are generated by the applications installed in the external electronic device, the processor 120 may receive notification data generated by the corresponding applications and transmit (or broadcast) the notification data to the applications installed in the electronic device 101.

According to an embodiment of the present disclosure, when the events are generated by the applications installed in the external electronic device, the processor 120 may generate notification data for informing of the generation of the events and transmit (or broadcast) the notification data to the applications installed in the electronic device 101 or the applications installed in the external electronic device.

According to an embodiment of the present disclosure, when events are generated by one or more applications, the processor 120 may generate additional notification data if a target of the event is an integration notification registered target. According to an embodiment of the present disclosure, the additional notification data may include at least one of a name of the registered target, a nickname, a phone number, a mail address, an image, a notification identifier (ID), and a file type (for example, document, music, movie, or the like). According to an embodiment of the present disclosure, the name, the nickname, the phone number, the mail address, and the image of the registered target may be generated based on contact information stored in the memory 130. According to an embodiment of the present disclosure, the notification ID may be generated based on information on a time point when the event is generated.

According to an embodiment of the present disclosure, the processor 120 may configure an integration notification UI for integrating notification data for informing of events generated in the electronic device 101 or the external electronic device (for example, the electronic device 103 or 104) and informing the user of the integrated notification data. The integration notification UI may be displayed on the screen through the display 160 of the electronic device 101, and the processor 120 may control the display 160 to display the notification data classified according to the each registered target or each application through the integration notification UI.

According to an embodiment of the present disclosure, the integration notification UI may be displayed on a home screen or a lock screen or displayed on an execution screen in which one or more applications are being executed. According to an embodiment of the present disclosure, even when power of the display 160 is an on state or off state, the integration notification UI may be displayed on the screen. The integration notification UI may be displayed on the entirety or part of the screen. For example, the integration notification UI may be displayed on the execution screen in which one or more applications are being executed or in a state where power of the part of the screen is turned on when power of the display 160 is turned off. According to an embodiment of the present disclosure, even though data (for example, a home screen lock screen, execution screen, and the like) is not displayed on the display 160, the integration notification UI may be displayed on the entirety or part of the screen regardless of the on/off state of the display 160.

According to an embodiment of the present disclosure, the processor 120 may divide the screen into two parts, and control the display 160 to display the home screen, the lock screen, or the execution screen of each application in a first area and the integration notification UI or notification data in a second area. In the second area, the integration notification UI for displaying notification data according to each registered target or notification data according to each application for each registered target may be displayed.

According to an embodiment of the present disclosure, the second area may be an area including a curve having the radius of a predetermined curvature or a curve having the continuous radius of curvature in the display 160. Further, the first area may be a flat area including at least a part of the curve. The first area and the second area are located to be connected to each other in position, but may be two physically separated displays, for example, a first display (not shown) and a second display (not shown).

According to an embodiment of the present disclosure, the integration notification according to each registered target or the notification data according to each application for each registered target may be displayed in the first area, and may be displayed in an area including the first area and at least a part of the second area.

The memory 130 may include a volatile memory and/or a non-volatile memory. The memory 130 may store, for example, commands or data related to at least one other component of the electronic device 101. According to an embodiment of the present disclosure, the memory 130 may store software and/or a program 140. The program 140 may include a kernel 141, middleware 143, an application programming interface (API) 145, and/or application programs (or applications) 147. At least some of the kernel 141, the middleware 143, and the API 145 may be referred to as an operating system (OS).

According to an embodiment of the present disclosure, information on a registered target (hereinafter, referred to as contact information), for example, a name, a nickname, a phone number, a mail address, and an image of the registered target may be stored in the memory 130. The image may include, for example, an image captured by the user, an image generated by editing in the electronic device 101 according to a user input, and an image including a plurality of frames.

The kernel 141 may control or manage system resources (for example, the bus 110, the processor 120, or the memory 130) used for executing an operation or function implemented in other programs (for example, the middleware 143, the API 145, or the application 147). Furthermore, the kernel 141 may provide an interface through which the middleware 143, the API 145, or the application program 147 may access individual components of the electronic device 101 to control or manage system resources.

For example, the middleware 143 may serve as a relay for allowing the API 145 or the application program 147 to communicate with the kernel 141 to exchange data. Furthermore, in regard to task requests received from the application program 147, the middleware 143 may perform a control (for example, scheduling or load balancing) for the task requests using, for example, a method of assigning, to at least one application, a priority for using the system resources (for example, the bus 110, the processor 120, or the memory 130) of the electronic device 101.

The API 145 is an interface by which the applications 147 control functions provided from the kernel 141 or the middleware 143, and may include, for example, at least one interface or function (for example, commands) for file control, window control, image processing, or text control.

The application program 147 may include an SMS/MMS application, an e-mail application, a calendar application, an alarm application, a health care application (for example, an application for measuring a work rate or a blood sugar), an environment information application (for example, an application for providing atmospheric pressure, humidity, or temperature information), etc. Additionally or alternatively, the application program 147 may be an application related to the exchange of information between the electronic device 101 and an external electronic device (for example, the electronic device 103 or 104). The application related to the exchange of information may include, for example, a notification relay application for transferring particular information to the external electronic device, or a device management application for managing the external electronic device.

For example, the notification relay application may include a function of transferring notification data generated in other applications (for example, the SMS/MMS application, the mail application, the health care application, or the environmental information application) of the electronic device 101 to an external electronic device (for example, the electronic device 103 or 104). Additionally or alternatively, the notification relay application may receive notification data from, for example, an external electronic device (for example, the electronic device 104) and provide the same to a user. The device management application, for example, may manage (for example, install, delete, or update) at least some functions (for example, turning external electronic device (or some elements) on or off or adjusting the brightness (or resolution) of a display) of an external electronic device (for example, the electronic device 104) that communicates with the electronic device 101, applications performed in the external electronic device, or services (for example, a phone call service, or a messaging service) provided in the external electronic device.

According to an embodiment of the present disclosure, the application program 147 may include applications, which are designated according to a property (for example, the type of electronic device) of the external electronic device (for example, the electronic device 104). For example, when the external electronic device is an MP3 player, the application program 147 may include an application related to the reproduction of music. Similarly, when the external electronic device is a mobile medical appliance, the application program 147 may include an application related to health care. According to an embodiment of the present disclosure, the application program 147 may include at least one of applications designated in the electronic device 101 or applications received from an external electronic device (for example, a server 106 or the electronic device 104).

The input/output interface 150 may serve as, for example, an interface that may transfer commands or data, which is input from the user or another external device, to the other component(s) 110 to 140 and 160 to 170 of the electronic device 101. Further, the input/output interface 150 may output commands or data received from other component(s) 110 to 140 and 160 to 170 of the electronic device 101 to the user or another external device.

The display 160 may include, for example, a liquid crystal display (LCD), a light emitting diode (LED) display, an organic LED (OLED) display, a micro electro mechanical system (MEMS) display, or an electronic paper display. The display 160 may display various types of contents (for example, text, images, videos, icons, or symbols) to users. The display 160 may include a touch screen and receive, for example, a touch input, a gesture input, a proximity input, or a hovering input using an electronic pen or a user's body part.

According to an embodiment of the present disclosure, the touch screen included in the display 160 may be a rectangle. The rectangle may include a first periphery and a second periphery shorter than the first periphery. Further, the touch screen may include a first part and a second part connected to the first part or adjacent to the first part. The first part and the second part may be disposed along the first periphery.

The communication interface 170 may establish, for example, communication between the electronic device 101 and an external device (for example, a first external electronic device 103, a second external electronic device 104, or the server 106). For example, the communication interface 170 may be connected to a network 162 through wireless or wired communication to communicate with the external device (for example, the second external electronic device 104 or the server 106).

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may include at least one of, for example, Wi-Fi, Bluetooth (BT), near field communication (NFC), and global navigation satellite system (GNSS). The GNSS may include at least one of, for example, a GPS, a global navigation satellite system (GLONASS), a BeiDou navigation satellite system (hereinafter referred to as "BeiDou"), and a European global satellite-based navigation system (Galileo), according to a use area, a bandwidth, or the like. Hereinafter, in the present disclosure, the term "GPS" may be interchangeably used with the term "GNSS." The wired communication may include, for example, at least one of a universal serial bus (USB), a high definition multimedia interface (HDMI), recommended standard 232 (RS-232), and a plain old telephone service (POTS). The network 162 may include a telecommunication network, for example, at least one of a computer network (for example, a local area network (LAN) or a wide area network (WAN)), Internet, a telephone network, and an Internet of things (IoT) network.

The computer network may include at least one of Wi-Fi, BT, NFC, global navigation satellite system (GNSS), ZigBee, and Z-WAVE. The GNSS may include at least one of, for example, a GPS, a GLONASS, a BeiDou, and a Galileo, according to a use area, a bandwidth, or the like.

Each of the first and second external electronic devices 103 and 104 may be a device which is the same as or different from the electronic device 101. According to an embodiment of the present disclosure, the server 106 may include a group of one or more servers.

According to various embodiments of the present disclosure, all or some of the operations performed by the electronic device 101 may be performed by another electronic device or a plurality of electronic devices (for example, the electronic device 103 or 104 or the server 106). According to an embodiment of the present disclosure, when the electronic device 101 should perform some functions or services automatically or by request, the electronic device 101 may make a request for performing at least some of the functions related to the functions or services to another device (for example, the electronic device 103 or 104 or the server 106) additionally or instead of performing the functions or services by itself. The other electronic device (for example, the electronic device 103 or 104 or the server 106) may carry out the requested function or the additional function and transfer the result, obtained by carrying out the function, to the electronic device 101. The electronic device 101 may provide the requested functions or services based on the received result as it is or after additionally processing the received result. To achieve this, for example, cloud computing, distributed computing, or client-server computing technology may be used.

An electronic device according to an embodiment of the present disclosure may include a processor electrically connected to the display and a memory electrically connected to the processor, wherein the memory stores instructions to make the processor display a first part and a second part connected or adjacent to the first part in some areas of the touch screen, display a first information display area on the touch screen in response to a first user input received through the first part, display a second information display area on the touch screen in response to a second user input received through the second part, display information received from the outside by the electronic device in connection with first contact information stored within the memory in the first information display area, and display information received from the outside by the electronic device in connection with second contact information stored within the memory in the second information display area, when being executed.

Figure 2:
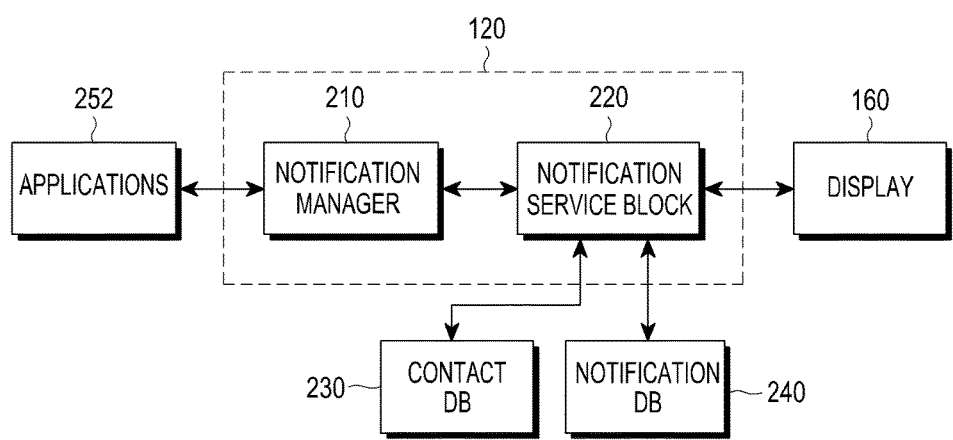
FIG. 2 is a block diagram illustrating an example of a processor of an electronic device, such as the processor 120 of the electronic device illustrated in FIG. 1, according to various embodiments of the present disclosure.

FIG. 2 is a block diagram illustrating an example of a processor of an electronic device, such as the processor 120 of the electronic device illustrated in FIG. 1, according to an embodiment of the present disclosure.

Referring to FIG. 2, the processor 120 may include a notification manager 210 and a notification service block 220.

The notification manager 210 may receive notification data generated by each of one or more applications installed in the electronic device 101 or applications installed in the external electronic device from each of applications 252. According to an embodiment of the present disclosure, when an event is generated by one of the applications 252, the notification manager 210 may generate notification data for informing of the generation of the corresponding event. The notification manager 210 may transmit (or broadcast) the notification data to the applications 252. Further, the notification manager 210 may transfer the notification data to the notification service block 220.

The notification service block 220 may determine the application by which the corresponding event is generated based on the notification data. According to an embodiment of the present disclosure, the notification data may include information on the application by which the corresponding event is generated, for example, a name of the application and information on a registered target related to the event (for example, a name, phone number, mail address, and image of the registered target). According to an embodiment of the present disclosure, the notification data may include information on a file or folder by which the corresponding event is generated, for example, a name of the file or folder and information on a registered target related to the event (for example, a name, phone number, mail address, and image of the registered target). Further, the notification service block 220 may distinguish the type of data received from or shared with the external electronic device (for example, the electronic device 103 or 104). When the data is received from or shared with the external electronic device, the notification service block 220 may generate notification data on reception or sharing of the data. At this time, the notification service block 220 may insert the type of the received or shared data (for example, music, picture, movie, document, dynamic image, and the like) into the notification data. For example, when the electronic device 101 shares two dynamic image files with the external electronic device, the processor 120 may generate notification data for informing that the two files are shared with the external electronic device and that the corresponding files are the dynamic image files.

According to an embodiment of the present disclosure, the notification service block 220 may generate or update a UI, that is, an integration notification UI, for informing the user of one or more pieces of notification data generated in the electronic device 101 based on the notification data.

The integration notification UI is a UI displayed on the screen (for example, the home screen lock screen, application execution screen, or the like) through the display 160, and refers to a UI for classifying and managing notification data generated within the electronic device 101 or the external electronic device (for example, the electronic device 103 or 104) according to each registered target or each application and providing the user with the notification data classified according to each registered target or each application.

According to an embodiment of the present disclosure, the application 252 by which the event is generated may notify the notification manager 210 of the generation of the event. The notification service block 220 may generate the notification data based on the information notified to the notification manager 210 from the application 252. Further, the notification manager 210 may transmit (or broadcast) the notification data generated by the notification service block 220 to the applications 252.

According to an embodiment of the present disclosure, the notification manager 210 may detect generation of an event of one of the applications 252. The notification manager 210 may transfer the generation of the event (for example, mail reception, message reception, or the like) to the notification service block 220. The notification service block 220 may generate notification data on the corresponding event. For example, the notification service block 220 may include a name of the application, a registered target related to the corresponding event, and an item related to the corresponding event (for example, the content of mail, the content of a message, and a time when the event is generated).

According to an embodiment of the present disclosure, the notification service block 220 may determine the registered target related to the event with reference to a contact database (DB) 230. For example, it may be assumed that a schedule alarm of "call with Jenni at 2 p.m." is generated as an event by a schedule application among the applications 252. The notification manager 210 may detect the generation of the event of the "schedule alarm" by the schedule application. Further, the notification manager 210 may inform the notification service block 220 of the generation of the event of the "schedule alarm" by the schedule application. The notification service block 220 may detect that the schedule alarm event is related to the registered target with the name of Jenni through the content of the schedule alarm, that is, an item of "call with Jenni at 2 p.m." The notification service block 220 may generate Noti-01 as the notification data on the schedule alarm event and transfer Noti-01 to the notification manager 210 to allow the Noti-01 to be broadcasted to the applications 252. According to an embodiment of the present disclosure, Noti-01 may include information indicating that the schedule alarm event is generated by the schedule application, information indicating that the schedule alarm event is related to the registered target Jenni, contact information of Jenni (for example, name, phone number, mail address, and the like), and information indicating that the schedule alarm event is related to a call application.

According to an embodiment of the present disclosure, the notification service block 220 may classify the notification data generated by respective applications according to each application 252. The notification service block 220 may classify the notification data generated by respective applications 252 according to, for example, each registered target related to each of the corresponding events as shown in Table 1. Further, the notification service block 220 may provide the user with the notification data classified according to each registered target through the integration notification UI or provide the user with the notification data classified according to each application through the integration notification UI.

For example, the integration notification UI may include four pages, and the pages may be allocated to applications Appl-01, Appl-02, Appl-03, and Appl-04, respectively. Notification data generated by the corresponding application or an item related to the events (for example, mail reception or the like) corresponding to each of the notification data may be displayed in each of the pages.

For example, the integration notification UI may include four pages, and the pages may be allocated to for example, registered targets Contact-01, Contact-02, Contact-03, and Contact-04, respectively. Notification data on the event related to the corresponding registered target or an item related to the events (for example, mail reception or the like) may be displayed in each of the pages.

According to an embodiment of the present disclosure, the notification service block 220 may assign a priority to each of the registered targets to manage the notification data for the registered targets. The priority may be determined according to a user input through the input/output interface 150. According to an embodiment of the present disclosure, the priority may be determined according to event frequency related to the registered target. For example, the notification service block 220 may give a higher priority to a registered target having a high related event occurrence frequency rather than a registered target having a relatively low related event occurrence frequency.

According to an embodiment of the present disclosure, the priority may be determined according to a communication time with the registered target. For example, the notification service block 220 may give a higher priority to a registered target having a long communication time with the registered target rather than a registered target having a relatively short communication time. The communication time with the registered target may be a time during which the user of the electronic device 101 exchanges messages or mail through the electronic device 101, makes a phone call, plays a game, or shares an application or file with the registered target. The notification service block 220 may record the communication time with each of the registered targets according to each application or each registered target in the memory 130 and calculate an accumulated time. The notification service block 220 may determine a priority of the corresponding registered target according to a length of the accumulated time. According to an embodiment of the present disclosure, the processor 120 may control the display 160 to display notification data according to the priority.

According to an embodiment of the present disclosure, the notification service block 220 may assign a priority to each of the applications 252 to manage the notification data for each of the applications 252. The priority may be determined according to a user input through the input/output interface 150. According to an embodiment of the present disclosure, the priority may be determined according to an occurrence frequency of the event generated by the application. For example, the notification service block 220 may give a higher priority to an application having a high event occurrence frequency rather than an application having a relatively low event occurrence frequency. According to an embodiment of the present disclosure, the priority may be determined according to a use time of each application. For example, the notification service block 220 may give a higher priority to an application having a long use time rather than an application having a relatively short use time. The notification service block 220 may record a time when each application is executed, a time when each application ends, or an execution time of each application in the memory 130. Further, the notification service block 220 may calculate an accumulated time of the execution times of each application. The notification service block 220 may determine a priority of the corresponding registered target according to a length of the accumulated time. According to an embodiment of the present disclosure, the processor 120 may control the display 160 to display notification data according to the priority.

The contact DB 230 or a notification DB 240 may be formed in the memory 130 by the notification service block 220 of the processor 120. The contact DB 230 may store registered targets, which are registered in the electronic device 101, and contact information on each of the registered targets (for example, a name, nickname, address, phone number, email address, image, and the like) in such a manner that the registered targets correspond to the contact information. The contact DB 230 may store, for example, data in the form as shown in Table 2 below.

TABLE 2

| Registered target | Contacts | |
| --- | --- | --- |
| | Data type | Data |
| R01 | Nickname | AAAA |
| | Phone number 1 | 010-2222-3333 |
| | Phone number 2 | 010-1111-2222 |
| | Email | aaa@email.com |
| | ... | ... |
| R02 | Nickname | BBBB |
| | Phone number 1 | 010-333-4444 |
| | Phone number 2 | |
| | Email | bbb@email.com |
| | ... | ... |
| | ... | ... |

Referring to Table 2, a nickname of the registered target R01 is "AAAA", there are two registered phone numbers corresponding to R01, "010-2222-3333" and "010-1111-2222", and an email address of R01 is "aaa@email.com." Further, a nickname of the registered target R02 is "BBBB", there is one phone number, "010-333-4444", and an email address of R02 is "bbb@email.com." As described above, the contact information recorded in the contact DB 230 may be recorded by the processor 120 according to a user input. According to an embodiment of the present disclosure, the notification service block 220 may generate the contact DB 230 and update the contact DB 230. Further, the notification service block 220 may update the contact DB 230 by merging contacts of the same registered target among the contacts stored in the contact DB 230.

According to an embodiment of the present disclosure, the notification DB 240 may store the number of pieces of notification data according to each application with respect to each of the registered targets who are registered in the electronic device 101. The notification DB 240 may store, for example, data in the form as shown in Table 3 below.

TABLE 3

| Registered target | Application | Number of pieces of notification data |
| --- | --- | --- |
| R01 | Appl-01 | 0 |
| R01 | Appl-02 | 1 |
| R01 | Appl-03 | 1 |
| R01 | ... | ... |
| R02 | Appl-01 | 1 |
| R02 | Appl-02 | 2 |
| R02 | Appl-03 | 0 |
| R02 | ... | ... |
| ... | ... | ... |

Referring to Table 3, with respect to the registered target R01, the number of pieces of notification data by the application Appl-01 is 0, the number of pieces of notification data by Appl-02 is 1, and the number of pieces of notification data by Appl-03 is 1. With respect to the registered target R02, the number of pieces of notification data by the application Appl-01 is 1, the number of pieces of notification data by Appl-02 is 2, and the number of pieces of notification data by Appl-03 is 0. As described above, the number of pieces of notification data recorded in the notification DB 240 may be recorded by the processor 120 according to the generation of the notification data by each of the applications.

According to an embodiment of the present disclosure, the notification service block 220 may generate the notification DB 240 and update the notification DB 240. Whenever the notification data is generated according to each application with respect to each of the registered targets, the notification service block 220 may increase the number of pieces of notification data corresponding to the corresponding application to update the notification DB 240. Further, whenever the user identifies the notification data, the notification service block 220 may decrease the number of pieces of notification data corresponding to the corresponding application to update the notification DB 240.

In accordance with an aspect of the present disclosure, an electronic device is provided. The electronic device includes a display comprising a touch screen, and a processor configured to control the display to display a first information display area on a touch screen in response to a first user input received through a first part in some areas of the touch screen including the first part and a second part connected or adjacent to the first part, control the display to display a second information display area on the touch screen in response to a second user input received through the second part, and control the display to display first information received from the outside of the electronic device in the first information display area, the first information is associated with first contact information, and display second information received from the outside of the electronic device in the second information display area, the second information is associated with second contact information.

Figure 3:
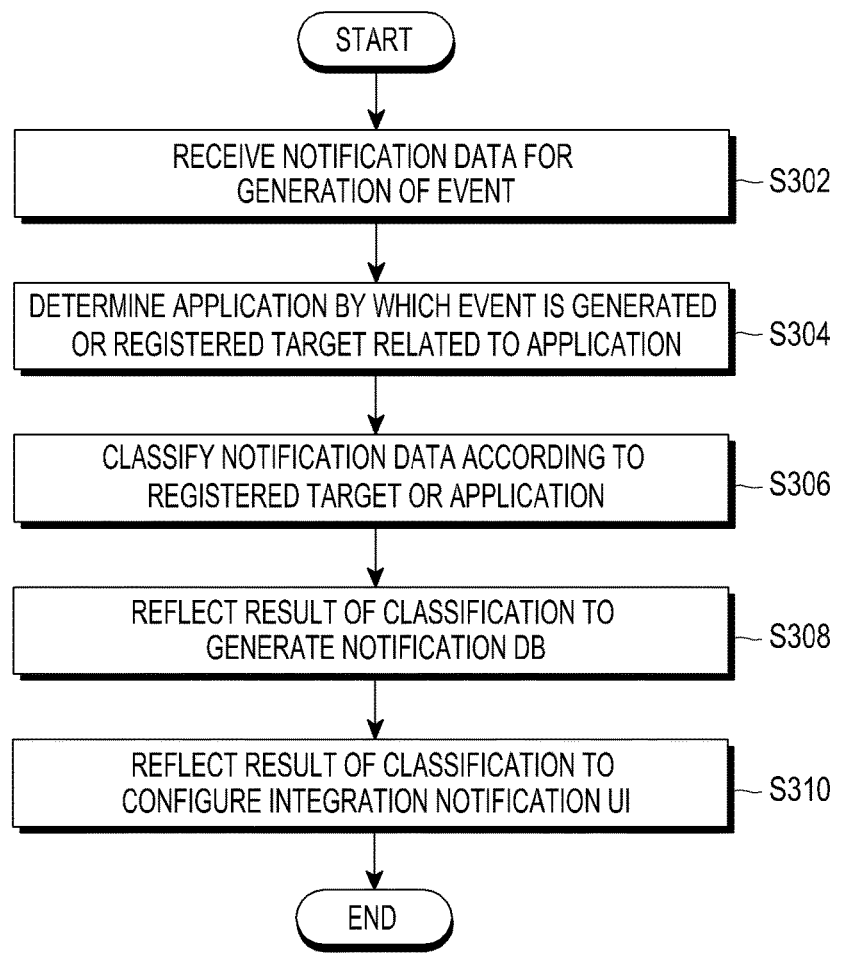
FIG. 3 is a flowchart illustrating an example of generation of a notification DB and displaying notification data by an electronic device according to various embodiments of the present disclosure.

FIG. 3 is a flowchart illustrating an example of generation of a notification DB and displaying notification data by an electronic device according to various embodiments of the present disclosure.

Referring to FIG. 3, when an event is generated in an electronic device (for example, the electronic device 101) or an external electronic device (for example, the electronic device 103 or 104), the notification manager 210 of the processor 120 may receive notification data on the event from the corresponding application in operation S302. According to an embodiment of the present disclosure, the notification data may be generated by the application or the notification service block 220 of the processor 120.

According to an embodiment of the present disclosure, the processor 120 may determine the application by which the event is generated or the registered target related to the event based on the notification data in operation S304. The processor 120 may determine the application by which the notification data is generated and the registered target related to the corresponding event by analyzing (or parsing) the notification data.

For example, it may be assumed that the notification data includes text of "three messages are received from Rima" The processor 120 may extract the name "Rima" (or nickname) from the notification data and determine the registered target having the extracted name (or nickname) as the registered target related to the notification data. Further, the processor 120 may extract the words "messages" and "received" from the text of the notification data, and determine that the application related to the notification data is a message application based on the words.

The processor 120 may classify the notification data according to the registered target or the application in operation S306. For example, the processor 120 may determine the notification data as one of pieces of notification data with respect to the registered target related to the event. For example, the processor 120 may determine the notification data as one of pieces of notification data with respect to the application.

Thereafter, the processor 120 may reflect a result of the classification to generate, for example, the notification DB 240 as shown in Table 3 in operation S308, and configure an integration notification UI in operation S310. For example, it may be assumed that the integration notification UI includes five pages and the pages are allocated to five applications, respectively. The processor 120 may display the notification data in the page allocated to the application by which the event is generated. For example, it may be assumed that the integration notification UI includes five pages and the pages are allocated to five registered targets, respectively. The processor 120 may display the notification data in the page allocated to the registered target related to the event. When the integration notification UI is configured, the processor 120 may control the display 160 to display the configured integration notification UI. According to an embodiment of the present disclosure, the processor 120 may control the display 160 to display the notification data in a status bar whenever the notification data is generated.

Figure 4:
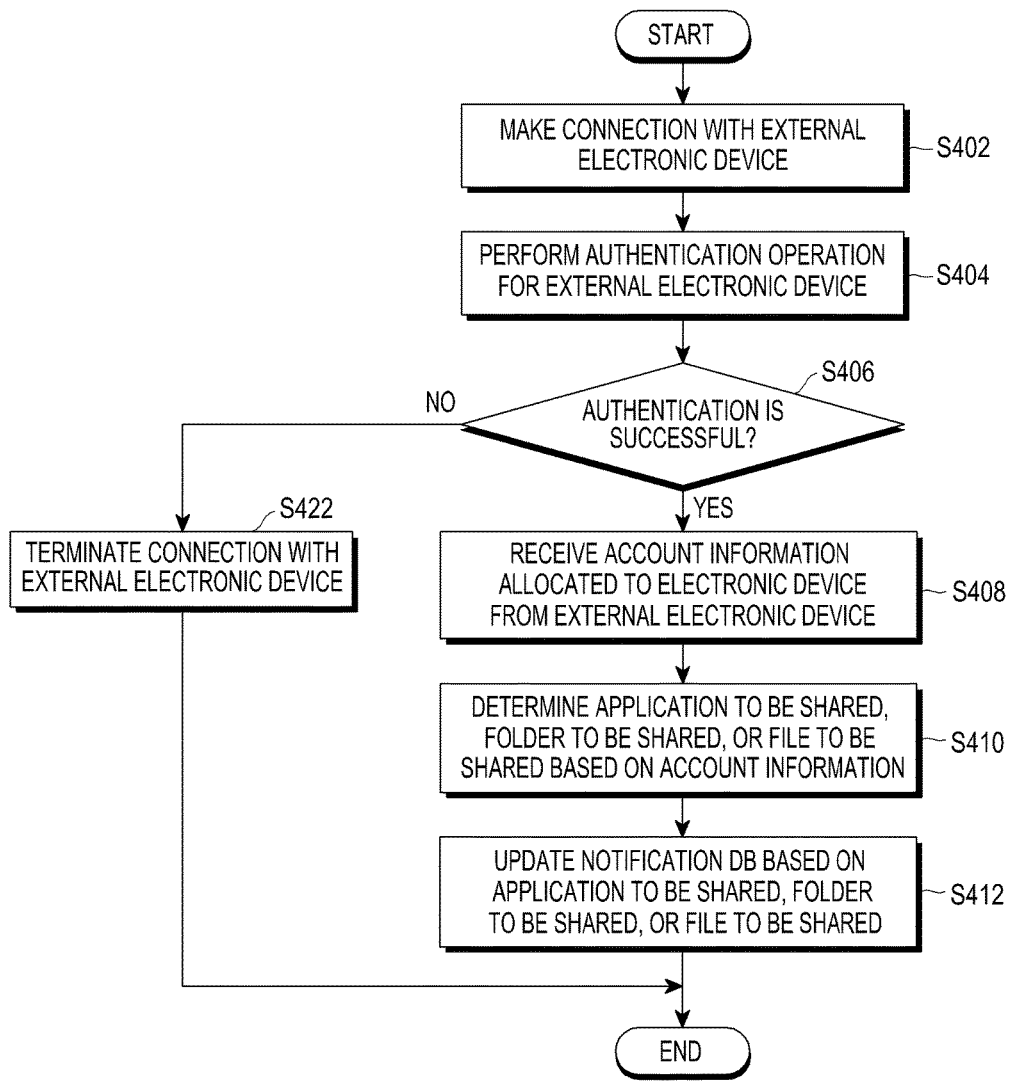
FIG. 4 is a flowchart illustrating an example of displaying notification data by an electronic device according to various embodiments of the present disclosure.

FIG. 4 is a flowchart illustrating an example of displaying notification data by an electronic device according to various embodiments of the present disclosure.

Referring to FIG. 4, an electronic device (for example, the electronic 101) may be connected to an external electronic device (for example, the electronic device 103 or 104) in operation S402. According to an embodiment of the present disclosure, the communication interface 170 may receive an access request from the external electronic device, generate an electrical signal for informing of the access request, and transfer the generated electrical signal to the processor 120. According to an embodiment of the present disclosure, the processor 120 may control the communication interface 170 to make the electronic device 101 request the access to the external electronic device. As described above, when the electronic device 101 and the external electronic device are connected to each other, the electronic device 101 or the external electronic device may perform an authentication operation for the counterpart.

According to an embodiment of the present disclosure, the processor 120 of the electronic device 101 may execute an authentication operation for the external electronic device in operation S404.

In the authentication process of operation S404, the processor 120 of the electronic device 101 may perform the authentication operation for the external electronic device based on information received from the external electronic device connected to the electronic device 101. For example, the electronic device 101 may receive information (hereinafter, referred to as user information) (for example, a name, nickname, phone number, email address, image, and the like) on the user registered as the user of the external electronic device from the external electronic device. The processor 120 of the electronic device 101 may determine whether the user of the external electronic device is the registered target who is registered in the electronic device 101 based on the user information. For example, when at least one of the name, the nickname, the phone number, the email address, and the image included in the user information is registered in the contacts of the electronic device 101, the processor 120 may determine that the external electronic device is the external electronic device of the corresponding registered target. For example, when at least one of the name, the nickname, the phone number, the email address, and the image included in the user information corresponds to the name, the nickname, the phone number, the email address, or the image, registered as the user of the electronic device 101, the processor 120 may determine that the user of the electronic device 101 is the same as the user of the external electronic device.

According to an embodiment of the present disclosure, the external electronic device may be at least one of one or more electronic devices connected to the electronic device 101 through a home network, electronic devices of users which can perform short-range communication with the electronic device 101, and electronic devices of other people which can perform short-range communication with the electronic device 101. The electronic device 101 may receive user information from each of the devices. Further, the processor 120 of the electronic device 101 may determine whether at least one of the name, the nickname, the phone number, the email address, and the image included in the user information corresponds to the name, the nickname, the phone number, the email address, or the image registered in the contacts of the electronic device 101 or data generated based on the information (name, nickname, phone number, email address, or image) to perform the authentication operation for the device.

According to an embodiment of the present disclosure, the processor 120 may display the user information received from the external electronic device on the display 160. When the user of the external electronic device is not the registered target who is registered in the electronic device 101, the processor 120 may display the user information on the display 160 and receive a user input for determining whether to authenticate the user of the external electronic device from the user of the electronic device 101. For example, it may be assumed that a name of the user of the external electronic device is "Harry." The processor 120 may control the display 160 to display "Authenticate Harry?" When a user input for selecting "yes" is received from the user of the electronic device 101, the processor 120 may determine that the authentication for the external electronic device is successful. When a user input for selecting "no" is received from the user of the electronic device 101, the processor 120 may determine that the authentication for the external electronic device fails.

According to an embodiment of the present disclosure, the electronic device 101 may receive user information on the external electronic device or device information during the process of authenticating the external electronic device. The device information may include information on the external electronic device, for example, a name of the external electronic device, a device ID of the external electronic device (or media access control (MAC) ID), a personal identification number (PIN) of the external electronic device, an unlock pattern password, authentication information (for example, an iris, a fingerprint, a voice, or a face image of the user of the external electronic device, or an iris, a fingerprint, a voice, or a face image of the user of the electronic device 101), or data generated based on the information. The memory 130 may store device information on an external device which can be connected to the electronic device 101. The processor 120 may determine whether the device information received from the external electronic device is similar or equal to the device information stored in the memory 130. When the device information received from the external electronic device is similar or equal to the device information stored in the memory 130, the processor 120 may determine that the authentication for the corresponding external electronic device is successful.

As described above, the external electronic device may execute the authentication for the electronic device 101 in operation S404. Similarly, the processor 120 of the electronic device 101 may authenticate the external electronic device. In operation S404, the processor 120 may determine whether the external electronic device is a device registered in the electronic device 101. When the external device is the device registered in the electronic device 101, the processor 120 may determine that the authentication for the external electronic device is successful. When the external device is not the device registered in the electronic device 101, the processor 120 may determine that the authentication for the external electronic device fails.

The processor 120 may determine whether the authentication for the external electronic device is successful in operation S406. When the authentication for the external electronic device fails based on a result of the determination of operation S406 in operation S406: No, for example, when the external electronic device is not the device pre-registered in the electronic device 101 or the electronic device 101 is not the device pre-registered in the external electronic device, the processor 120 may terminate the connection with the external electronic device in operation S422.

When the authentication for the external electronic device is successful based on the result of the determination of operation S406 in operation S406: Yes, the processor 120 may receive account information allocated to the electronic device 101 from the external electronic device in operation S408. The account information may be information indicating that the electronic device 101 is the device pre-registered in the external electronic device. The account information may be information indicating a range, an access range, or an access right by which the electronic device 101 can use applications or files within the external electronic device. The account information may include information on one or more applications, one or more files, or one or more folders shared with the electronic device 101 within the external electronic device.

According to an embodiment of the present disclosure, the external electronic device may assign the access range or the access right to each of the devices connected to the external electronic device and information indicating the access range or the access right may be the account information. The electronic device 101 may also figure out the access range or access right by which the electronic device 101 can access the external electronic device by receiving account information allocated to the electronic device 101 from the external electronic device.

As described above, the electronic device 101 may receive the account information allocated to the electronic device 101 from the external electronic device through the communication interface 170 in operation S408. The processor 120 may determine an application to be shared, a folder to be shared, or files to be shared based on the account information in operation S410. The application to be shared may be one or more applications shared with the electronic device 101 among the applications installed in the external electronic device. The folder to be shared may be one or more folders shared with the electronic device 101 among the folders stored in the external electronic device. The file to be shared may be one or more files shared with the electronic device 101. According to an embodiment of the present disclosure, the electronic device 101 may edit or delete the application to be shared, the folder to be shared, or the file to be shared according to the access right assigned to the external electronic device.

According to an embodiment of the present disclosure, when the application to be shared, the folder to be shared, or the file to be shared within the external electronic device are determined, the processor 120 may update the notification DB 240 based on the application to be shared, the folder to be shared, or the file to be shared in operation S412. For example, the processor 120 may add, to the notification DB 240, an item for the application to be shared, the folder to be shared, or the file to be shared.

Figure 5A:
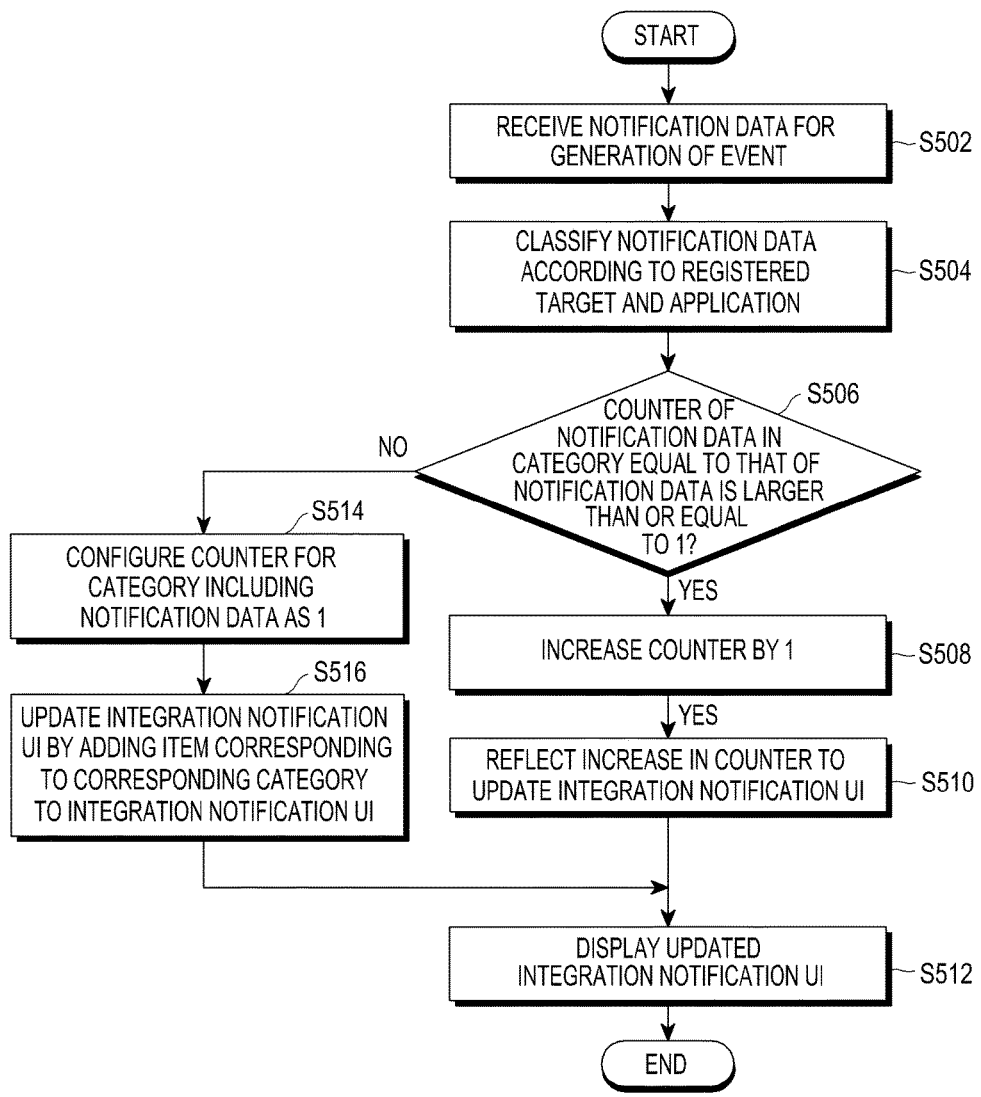
FIG. 5A is a flowchart illustrating an example of managing notification data by an electronic device according to various embodiments of the present disclosure.

FIG. 5A is a flowchart illustrating an example of displaying notification data by an electronic device according to various embodiments of the present disclosure.

Referring to FIG. 5A, when an event is generated by one of the applications 252 installed in the electronic device 101 or the external electronic device, the processor 120 may receive notification data on the generation of the event in operation S502. According to an embodiment of the present disclosure, the notification manager 210 may receive the notification data that informs of the generation of the event from the application by which the event is generated. According to an embodiment of the present disclosure, the notification service block 220 may generate the notification data.

According to an embodiment of the present disclosure, the processor 120 may classify the notification data according to the registered target and the application in operation S504. According to an embodiment of the present disclosure, the notification service block 220 of the processor 120 may determine the registered target for the notification data and classify the notification data as the notification data for the registered target. Further, the notification service block 220 may classify the notification data according to the application to classify the notification data as the notification data for the application by which the event is generated. For example, it may be assumed that an event for receiving a voice mail from Sam is generated. Since the event is transmitted from Sam and the event is generated by a voice mail application, the processor 120 may insert the notification data into a category "Sam/voice mail" to classify the notification data. According to an embodiment of the present disclosure, the processor 120 may manage the registered target to be a higher category than the application.

According to an embodiment of the present disclosure, the processor 120 may manage the application to be a higher category than the registered target. The notification service block 220 of the processor 120 may classify the notification data, which is generated according to each registered target, according to each application related to each of the corresponding events as shown in Table 4. Further, the notification service block 220 may provide the user with the notification data classified according to each application through an integration notification UI.

TABLE 4

| | A | B | C | D |
|---|---|---|---|---|
| Appl-01 | Noti-01 | Noti-02, Noti-03 | Noti-04 | Noti-05 |
| Appl-02 | None | Noti-06, Noti-07, Noti-08 | Noti-09 | None |
| Appl-03 | Noti-10 | Noti-11 | None | Noti-12, Noti-13 |
| Appl--4 | None | None | None | Noti-14 |

In Table 4, Noti-01 to Noti-14 correspond to notification data by Appl-01, Appl-02, Appl-03, and Appl-04. Referring to Table 4, with respect to Appl-01, one piece of notification data Noti-01 related to the registered target A is generated, two pieces of notification data Noti-02 and Noti-03 related to the registered target B are generated, one piece of notification data Noti-04 related to the registered target C is generated, and one piece of notification data Noti-05 related to the registered target D is generated. With respect to Appl-02, notification data related to the registered target A is not generated, three pieces of notification data Noti-06, Noti-07, and Noti-08 related to the registered target B are generated, one piece of notification data Noti-09 related to the registered target C is generated, and notification data related to the registered target D is not generated. With respect to Appl-03, one piece of notification data Noti-10 related to the registered target A is generated, one piece of notification data Noti-11 related to the registered target B is generated, notification data related to the registered target C is not generated, and two pieces of notification data Noti-12 and Noti-13 related to the registered target D are generated. With respect to Appl-04, notification data related to the registered targets A, B, and C is not generated, and one piece of notification data Noti-14 related to the registered target D is generated. The processor 120 may classify and manage the notification data generated in the electronic device 101 according to each registered target with respect to each application as shown in Table 4. Further, the processor 120 may display the notification data according to each registered target with respect to each application through the integration notification UI to provide the notification data to the user.

The processor 120 may determine whether a counter of the notification data in the same category as that of the notification data is larger than or equal to 1 in operation S506. The processor 120 may determine whether the notification data classified as the same category as that of the notification data is already stored. The notification service block 220 of the processor 120 may count the number of pieces of notification data classified as the same category. For example, when the number of pieces of notification data that informs of reception of the voice mail transmitted from Sam is 3, the counter of "category Sam/voice mail" may be "3."

When the counter of the notification data in the same category as that of the notification data is larger than or equal to 1 based on a result of the determination of operation S506 in operation S506: Yes, that is, when the notification data in the same category as that of the notification data already exists in the electronic device 101, the notification service block 220 of the processor 120 may increase the counter by 1 in operation S508. For example, when the counter of "category Sam/voice mail" is "3", the processor 120 may increase the counter to "4."

The notification service block 220 of the processor 120 may reflect the increase in the counter in operation S508 to update the integration notification UI in operation S510. For example, if the phrase "three voice mails are received from Sam" is displayed through the integration notification UI, the processor 120 may update the integration notification UI to display the phrase "four voice mails are received from Sam." The processor 120 may display the updated integration notification UI through the display 160 in operation S512. The notification data may be displayed in a status bar located at the upper part of the screen.

When the counter of the notification data in the same category as that of the notification data is smaller than 1 based on a result of the determination of operation S506 in operation S506: No, that is, when the notification data in the same category as that of the notification data does not exist in the electronic device 101, the notification service block 220 of the processor 120 may configure the counter of the category including the notification data as 1 in operation S514. For example, the notification service block 220 of the processor 120 may create a category of "Sam/voice mail" and configure the counter of the category as "1."

According to an embodiment of the present disclosure, the notification service block 220 of the processor 120 may update the integration notification UI by adding an item corresponding to the category to the integration notification UI in operation S516. For example, the processor 120 may add the item corresponding to the category of "Sam/voice mail" to the integration notification UI. It may be assumed that the integration notification UI is implemented in the form of a page according to each registered target. The processor 120 may add an item of "voice mail" to a page allocated to Sam and display "voice mail: 1" to update the integration notification UI so as to inform the user that the voice mail is received from Sam.

Subsequently, the processor 120 may display the updated integration notification UI through the display 160 in operation S512. The notification data may be displayed in a status bar located at the upper part of the screen.

Figure 5B:
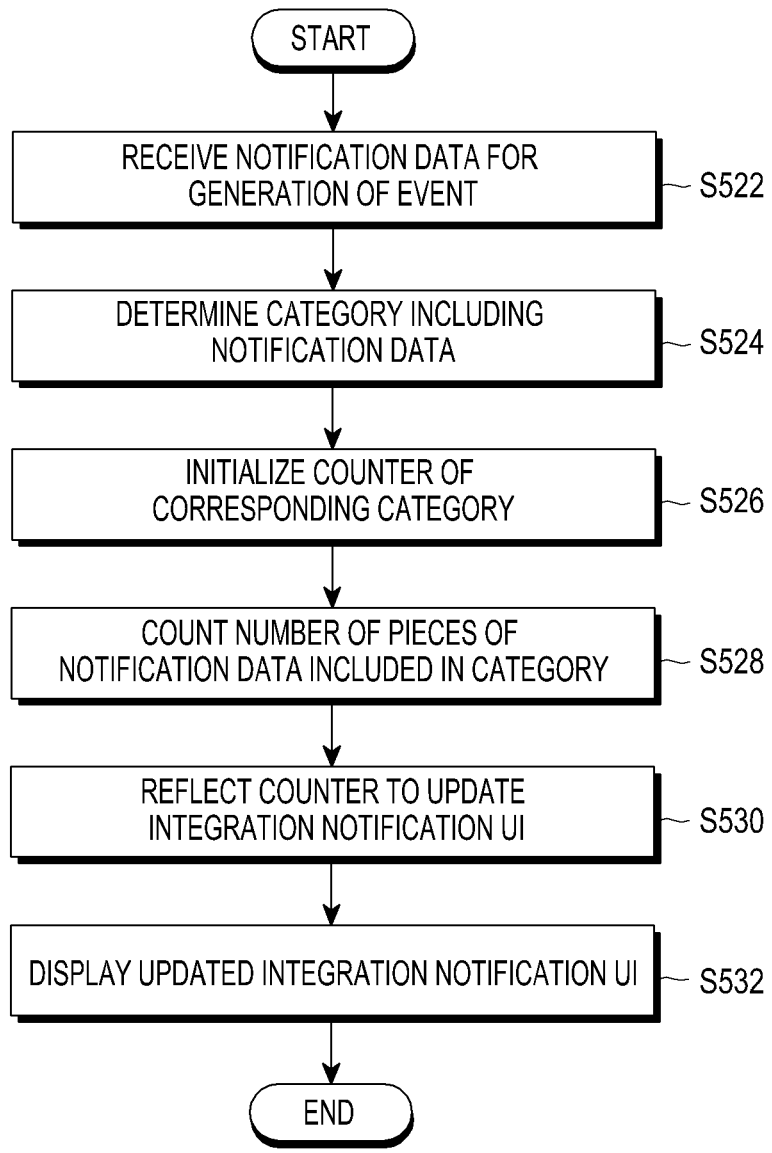
FIG. 5B is a flowchart illustrating an example of displaying notification data by an electronic device according to various embodiments of the present disclosure.

FIG. 5B is a flowchart illustrating an example of displaying notification data by an electronic device according to various embodiments of the present disclosure.

Referring to FIG. 5B, when an event is generated by one of the applications 252 installed in the electronic device 101, the processor 120 may receive notification data for the generation of the event in operation S522. According to an embodiment of the present disclosure, the notification manager 210 may receive the notification data that informs of the generation of the event from the application by which the event is generated. According to an embodiment of the present disclosure, the notification service block 220 may generate the notification data.

According to an embodiment of the present disclosure, the processor 120 may determine a category including the notification data in operation S524. According to an embodiment of the present disclosure, the notification service block 220 of the processor 120 may determine a registered target for the notification data and classify the notification data as the notification data for the registered target. Further, the notification service block 220 may classify the notification data according to the application to classify the notification data as the notification data for the application by which the event is generated. The processor 120 may determine the category including the notification data by determining the registered target for the notification data and the application by which the notification data is generated.

For example, it may be assumed that an event for receiving a message from Jane is generated. Since the event is transmitted from Jane and the event is generated by a message application, the processor 120 may insert the notification data into a category "Jane/message" to classify the notification data. Further, "Jane/message" may correspond to a category including the notification data. According to an embodiment of the present disclosure, the processor 120 may manage the registered target to be a higher category than the application.

When the category including the notification data is determined, the notification service block 220 of the processor 120 may initiate a counter of the corresponding category including the notification data as "0" in operation S526. Subsequently, the processor 120 may count the number of all pieces of notification data included in the category in operation S528. For example, it may be assumed that the number of pieces of notification data included in the category "Jane/message" among notification data generated before operation S522 is two. That is, it may be assumed that the number of "Jane/message" is "2." Since the notification data included in "Jane/message" is generated in operation S522, the processor 120 may initiate the counter corresponding to the category "Jane/message" as "0." Subsequently, the processor 120 may count the number of all pieces of notification data included in "Jane/message" with the notification data generated in operation S522. When the number of all pieces of notification data included in "Jane/message" with the notification data generated in operation S522 is three, the notification service block 220 may determine the counter of the category "Jane/message" as "3."

According to an embodiment of the present disclosure, the notification service block 220 of the processor 120 may reflect the counter determined in operation S528 to update the integration notification UI in operation S530. For example, when the counter of the category "Jane/message" is "3", the processor 120 may update the integration notification UI to display "three messages are received from Jane" through the integration notification UI. The processor 120 may display the updated integration notification UI through the display 160 in operation S532.

Figure 6A:
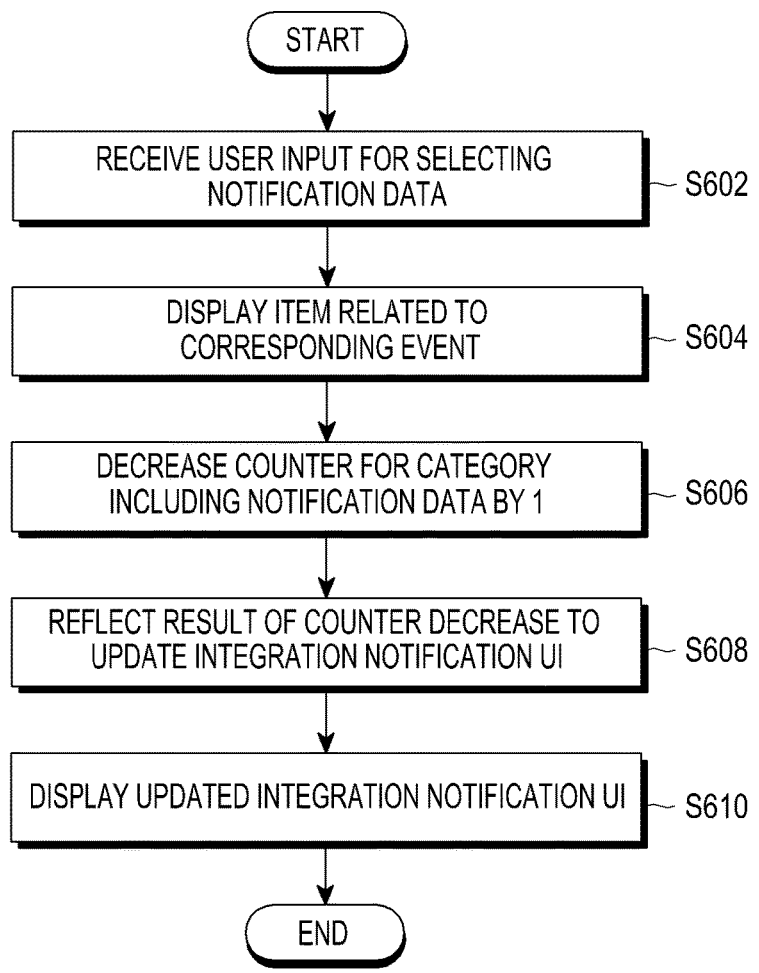
FIG. 6A is a flowchart illustrating an example of managing notification data by an electronic device according to various embodiments of the present disclosure.

FIG. 6A is a flowchart illustrating an example of managing notification data by an electronic device according to various embodiments of the present disclosure.

Referring to FIG. 6A, the processor 120 may receive a user input for selecting notification data through the input/output interface 150 in operation S602. The processor 120 may display an item related to an event corresponding to the notification data through the display 160 in operation S604. For example, it may be assumed that the electronic device 101 displays notification data for one voice mail received from Sam on the display 160 of the electronic device 101. The user may identify the notification data through the integration notification UI. The user may make a user input into the electronic device 101 to identify the event corresponding to the notification data by selecting the notification data. The user input may include a touch input (for example, including a gesture input such as a multi-touch, a swipe input, or the like) or a motion input. According to an embodiment of the present disclosure, the processor 120 may display, on the display 160, voice mail corresponding to the notification data as the item related to the event corresponding to the notification data. The notification data may be displayed on the integration notification UI, that is, a status bar located at the upper part or lower part of the screen. The processor 120 may display the number of pieces of notification data according to each application or according to each registered target through the integration notification UI, the status bar located at the upper part or lower part of the screen. Further, the status bar may display most recently generated notification data.

Subsequently, the notification service block 220 of the processor 120 may decrease a counter of a category including the notification data by 1 in operation S606. For example, the notification service block 220 of the processor 120 may decrease the counter of "Sam/voice mail" by 1. The notification service block 220 may reflect a result of the counter decrease in operation S606 to update the integration notification UI in operation S608. The processor 120 may display the updated integration notification UI by controlling the display 160 in operation S610.

Figure 6B:
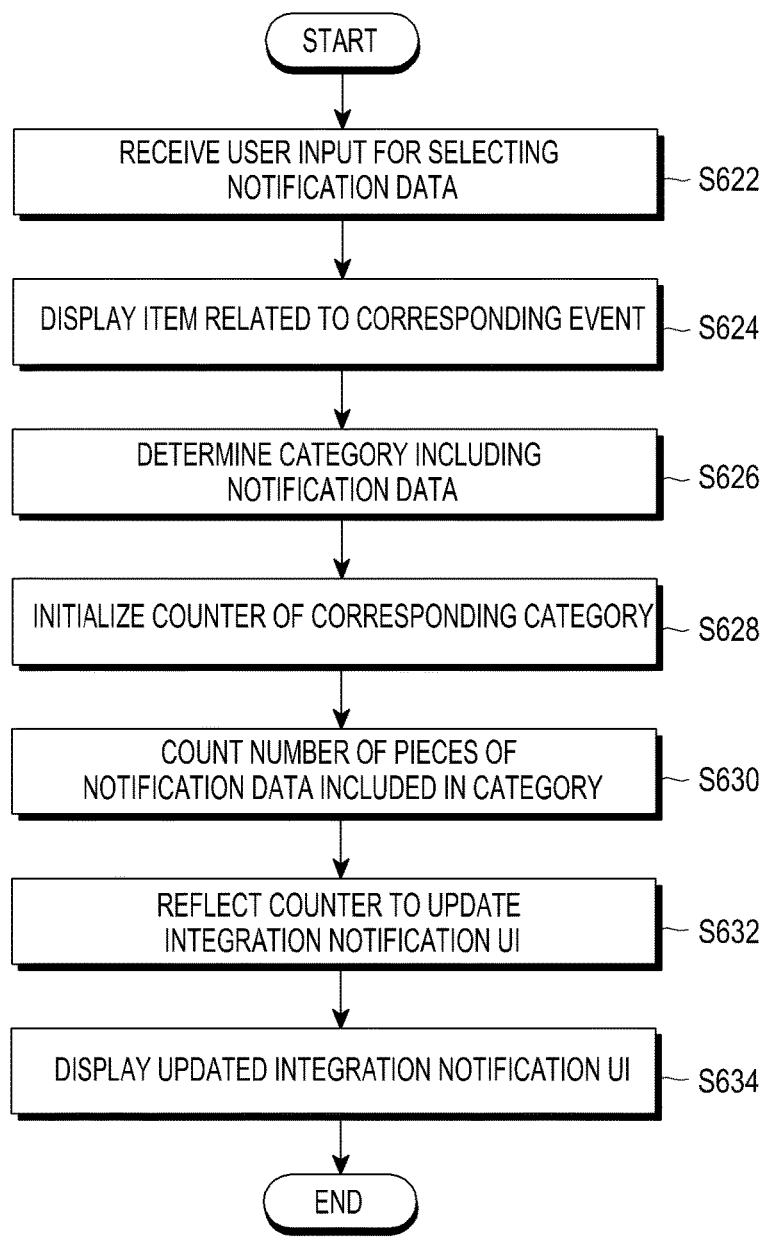
FIG. 6B is a flowchart illustrating an example of managing notification data by an electronic device according to various embodiments of the present disclosure.

FIG. 6B is a flowchart illustrating an example of managing notification data by an electronic device according to various embodiments of the present disclosure.

Referring to FIG. 6B, the processor 120 may receive a user input for selecting notification data through the input/output interface 150 in operation S622. The processor 120 may display an item related to an event corresponding to the notification data through the display 160 in operation S624. For example, it may be assumed that the electronic device 101 displays notification data for one voice mail received from Jane on the display 160 of the electronic device 101. The user may identify the notification data through the integration notification UI or the status bar. The user may make a user input (for example, a touch input, a sweep input, or the like) into the electronic device 101 to identify the event corresponding to the notification data by selecting the notification data. The processor 120 may display, on the display 160, a message corresponding to the notification data as the item related to the event corresponding to the notification data.

Subsequently, the notification service block 220 of the processor 120 may determine a category including the notification data in operation S626. The processor 120 may determine the category including the notification data by determining a registered target for the item and an application by which the item is displayed.

For example, it may be assumed that a user input for selecting one of three messages received from Jane is made. The processor 120 may control the display 160 to display a message through a message-related application. Further, the processor 120 may determine that the message displayed through the display 160 is included in the category "Jane/message", and determine that notification data for informing of the reception of the message is also included in the category "Jane/message."

According to an embodiment of the present disclosure, when the category including the notification data is determined, the notification service block 220 of the processor 120 may initiate a counter of the corresponding category including the notification data as "0" in operation S628. Subsequently, the processor 120 may count the number of all pieces of notification data included in the category in operation S630. For example, when the number of pieces of notification data included in "Jane/message" is "3" and the item identified by the user in operation S624 is one of the three message included in "Jane/message", the notification service block 220 may determine the counter of the notification data included in the category "Jane/message" as "2."

According to an embodiment of the present disclosure, the notification service block 220 of the processor 120 may reflect the counter determined in operation S630 to update the integration notification UI in operation S632. For example, when the counter of the category "Jane/message" is "2", the processor 120 may update the integration notification UI to display "two messages are received from Jane" through the integration notification UI. The processor 120 may display the updated integration notification UI through the display 160 in operation S634.

According to an embodiment of the present disclosure, the operations described in FIGS. 3 to 6B may be equally performed in a case where the external electronic device (for example, the electronic device 103 or 104) is connected to the electronic device 101.

In accordance with an aspect of the present disclosure, a method for displaying information at an electronic device is provided. The method includes displaying a first information display area on a touch screen in response to a first user input received through a first part in some areas of the touch screen including the first part and a second part connected or adjacent to the first part, displaying a second information display area on the touch screen in response to a second user input received through the second part, and displaying first information received from the outside of the electronic device in the first information display area, the first information is associated with first contact information, and displaying second information received from the outside of the electronic device in the second information display area, the second information is associated with second contact information.

FIGS. 7A to 7D illustrate an example of an integration notification UI displayed by an electronic device according to an embodiment of the present disclosure.

Figures 7A, 7B:
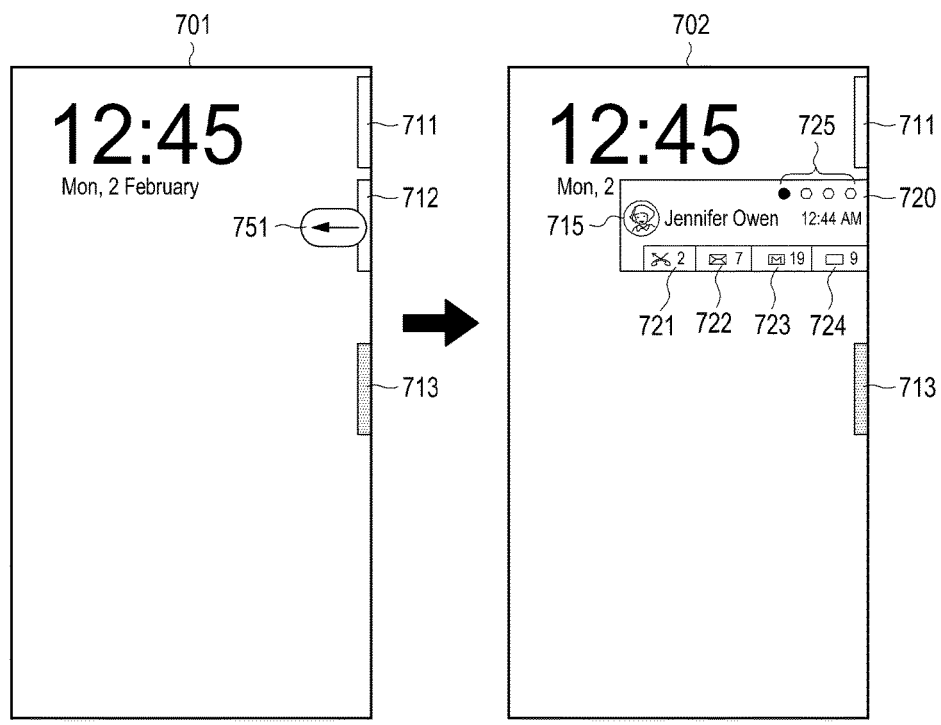
FIGS. 7A to 7D illustrate an example of an integration notification user interface (UI) displayed by an electronic device according to various embodiments of the present disclosure.

FIG. 7A illustrates a first screen 701 in which the integration notification UI does not display notification data, and FIG. 7B illustrates a second screen 702 in which the integration notification UI displays notification data. The integration notification UIs of FIGS. 7A and 7B correspond to examples in which the electronic device first displays notification data for a target to be managed by priority.

Referring to FIG. 7A, the integration notification UI may be displayed as vertically long box shaped-objects 711, 712, and 713 at the right side or left side of the home screen as illustrated in the first screen 701. In FIGS. 7A and 7B, the first object 711 is for adding the target to be managed by priority. When the first object 711 is selected by the user, the screen is switched and a screen for adding the target to be managed by priority (as illustrated in FIG. 8A) may be displayed through the display 160. The target to be managed by priority refers to a registered target having a high priority among the registered targets. The processor 120 may determine priorities of registered targets registered in the contacts according to a user input. The processor 120 may display, for example, notification data for five registered targets having the highest priority assigned by the user in preference to other notification data through the integration notification UI.

According to an embodiment of the present disclosure, the processor 120 may control the display 160 to preferentially display the registered targets having high priority, that is, notification data for the targets to be managed by priority through the integration notification UI. For example, the processor 120 may display notification data for five registered targets having the highest priority through the integration notification UI as illustrated in FIGS. 7A to 7D. At this time, other notification data may be displayed through the corresponding application or displayed on a status bar at the upper part or lower part of the display 160.

According to an embodiment of the present disclosure, the second object 712 or the third object 713 correspond to other objects (or images), that is, one of at least some of the notification page including notification data corresponding to the target to be managed by priority, that is, one of at least some of the notification page. When a user input for selecting the second object 712 or the third object 713 is not made, the screen may be displayed such that second object 712 or the third object 713 occupies a small area of the screen as illustrated in FIG. 7A. According to an embodiment of the present disclosure, when the display 160 is divided into two or more screens, for example, a first screen and a second screen, the processor 120 may control the display 160 to display the second object 712 or the third object 713, which is not selected by the user, on one of the first screen and the second screen.

In FIG. 7A, a user input 751 for selecting the second object 712 is made in the electronic device 101. The user input may include a touch input (for example, including a gesture input such as a multi-touch, a swipe input, or the like) or a motion input. The processor 120 may control the display 160 to switch the first screen 701 to the second screen 702 according to the user input 751.

Referring to FIG. 7B, a notification page corresponding to the second object 712 is displayed. FIG. 7B illustrates a first page 720 of the notification pages. All pages included in the notification pages may include at least one of information (for example, a name, a nickname, a phone number, an email address, an image, and the like) on a registered target (or a target to be managed by priority) corresponding to the notification page, a thumbnail 715 of an image indicating the registered target (or the target to be managed by priority), a page ID 725 indicating an order of the corresponding page among the notification pages, and counters 721, 722, 723, and 724 of notification data according to each application. In FIG. 7B, four pages IDs 725 indicating that the notification pages include four pages are displayed.

According to an embodiment of the present disclosure, the notification pages including one or more pages may be provided to the user in the form of displaying notification data for each of the applications on each of the pages allocated to each of the applications.

Referring to FIG. 7B, only an ID corresponding to an order of the currently displayed page among the four page IDs 725 is displayed with a color different from that of the remaining pages. That is, the notification pages include four pages and the page currently displayed on the second screen 702 among the pages is a first page 720.

According to an embodiment of the present disclosure, the notification page may display an item of an event related to the notification data displayed on the notification page or the number of pieces of notification data, that is, a counter. According to an embodiment of the present disclosure, when the number of pieces of notification data of the corresponding category is 1, all or some of the items related to the notification data may be displayed through the corresponding page.

According to an embodiment of the present disclosure, when all items corresponding to the notification data can be displayed through the integration notification UI, the processor 120 may display the items on the integration notification UI. The first page 720 displays notification data for a call-related event with Jennifer Owen, who is a registered target, as a page for a call application. In a case of the call-related event (for example, a missed call or the like), the user may easily identify the call-related event through the integration notification UI even through only the corresponding registered target and the event generation time are displayed. That is, the notification data displayed on the first page 720 may include all items of the call-related event.

According to an embodiment of the present disclosure, the processor 120 may display the time (12:44 AM) when the corresponding event (missed call) is generated and the registered target (Jennifer Owen) related to the event on the first page 720 as illustrated in FIG. 7B, so as to provide the integration notification UI to allow the user to identify the content of the call-related event even though the user does not execute the call application.

According to an embodiment of the present disclosure, when a user input for selecting one of the counters 721, 722, 723, and 724 for notification data according to each application is made, the processor 120 may control the display 160 to display notification data corresponding to the counter. The processor 120 may control the electronic device 101 to display the corresponding notification data or item by executing the application corresponding to the selected counter. For example, when a user input for selecting a counter 722 for a message is made, a message application may be executed and notification data for informing of reception of the message may be displayed, the corresponding message may be displayed, or a message writing window for allowing the user to write a response message to the corresponding registered target may be displayed. At this time, a recipient of the response message may be automatically designated to the registered target. Similarly, when a user input for selecting a counter 721 for a missed call is made, a call application may be executed and notification data for informing of generation of a missed call log may be displayed, the corresponding missed call log may be displayed, or a call originating window in a state where a phone number of the registered target is automatically input may be displayed to allow the user to make a call to the corresponding registered target.

According to an embodiment of the present disclosure, when a user input for selecting one of the counters 721, 722, 723, and 724 for notification data according to each application is made, an application by which the user can communicate with the registered target related to the notification data may be further activated in addition to the application by which the notification data is generated. For example, when a user input for selecting the counter 722 for a message is made, corresponding notification data, the corresponding message, or a message writing window for allowing the user to write a response message to the corresponding registered target may be displayed, and also a call originating window for allowing the user to make a call to the registered target may be additionally displayed according to a user input.

According to an embodiment of the present disclosure, when a user input for selecting the counter 724 for the external electronic device is made, the processor 120 may display data received from the external electronic device (for example, reproduce a media file) or access a folder shared with the external electronic device to display a list of files stored in the folder. According to an embodiment of the present disclosure, the counter 724 for the external electronic device may include a count by which the external electronic device attempts access to the electronic device 101 and the notification data for the external electronic device may include a count by which the external electronic device attempts access to the electronic device 101, a time when the external electronic device attempts access to the electronic device 101, and whether the access is successful or not.

Figures 7C, 7D:
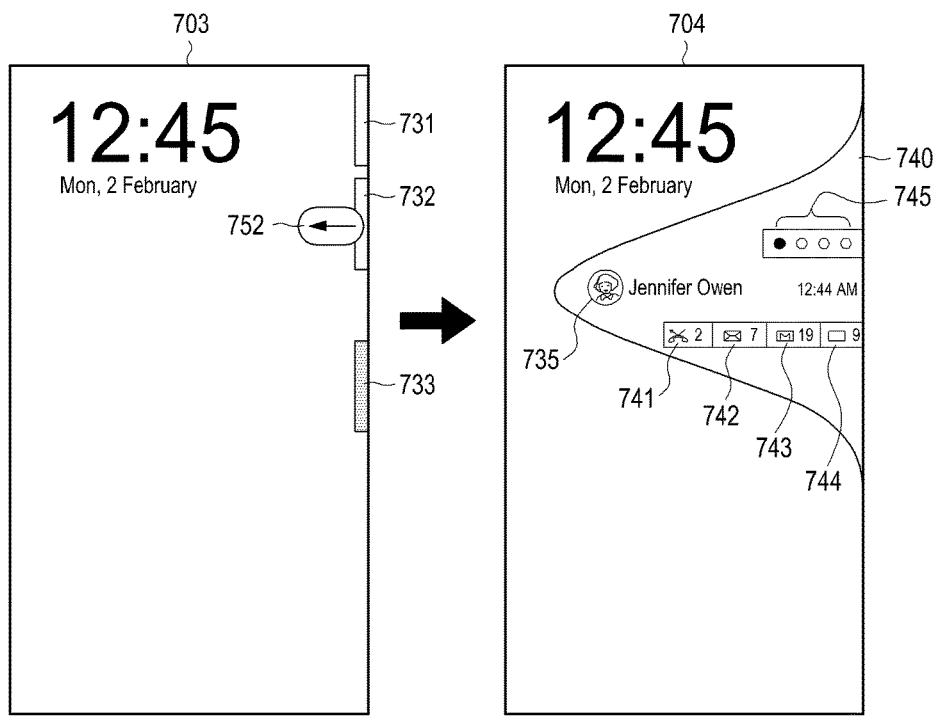

FIG. 7C illustrates a first screen 703 in which the integration notification UI does not display notification data, and FIG. 7D illustrates a second screen 704 in which the integration notification UI displays notification data. The integration notification UIs of FIGS. 7C and 7D correspond to examples in which the electronic device first displays notification data for a target to be managed by priority.

Referring to FIG. 7C, the integration notification UI may be displayed as vertically long box shaped-objects 731, 732, and 733 at the right side or left side of the home screen as illustrated in the first screen 703. In FIGS. 7C and 7D, the first object 731 is for adding the target to be managed by priority. When the first object 731 is selected by the user, the screen is switched and a screen for adding the target to be managed by priority (as illustrated in FIG. 8A) may be displayed through the display 160. The target to be managed by priority refers to a registered target having a high priority among the registered targets. The processor 120 may determine priorities of registered targets registered in the contacts according to a user input. The processor 120 may display, for example, notification data for five registered targets having the highest priority assigned by the user in preference to other notification data through the integration notification UI. According to an embodiment of the present disclosure, the processor 120 may control the display 160 to display only the registered targets having high priority, that is, only notification data for the targets to be managed by priority through the integration notification UI as illustrated in FIGS. 7A to 7D. For example, the processor 120 may display only the notification data for five registered targets having the highest priority through the integration notification UI. At this time, other notification data may be displayed through the corresponding application or displayed on a status bar at the upper part or lower part of the display 160.

According to an embodiment of the present disclosure, the second object 732 and the third object 733 correspond to the part of the notification page for displaying notification data corresponding to the set target to be managed by priority. When a user input for selecting the second object 732 or the third object 733 is not made, the second object 732 or the third object 733 may be displayed to occupy small areas of the home screen as illustrated in FIG. 7C (only the part of the notification page is displayed on the screen).

In FIG. 7C, a user input 752 (for example, a swipe input) for selecting the second object 732 is made in the electronic device 101. The processor 120 may control the display 160 to switch the first screen 703 to the second screen 704 according to the user input 752.

Referring to FIG. 7D, a notification page corresponding to the second object 732 is displayed. FIG. 7D illustrates a first page 740 of the notification pages. All pages included in the notification pages may include at least one of information (for example, a name, a nickname, a phone number, an email address, an image, and the like) on a registered target (or a target to be managed by priority) corresponding to the notification page, a thumbnail 735 of an image indicating the registered target (or the target to be managed by priority), a page ID 745 indicating an order of the corresponding page among the notification pages, and counters 741, 742, 743, and 744 of notification data according to each application. In FIG. 7D, four pages IDs 745 indicating that the notification pages include four pages are displayed. According to an embodiment of the present disclosure, the notification pages including one or more pages may be provided to the user in the form of displaying notification data for each of the applications on each of the pages allocated to each of the applications.

Referring to FIG. 7D, only an ID corresponding to an order of the currently displayed page among the four page IDs 745 is displayed with a color different from that of the remaining pages. That is, the notification pages include four pages and the page currently displayed on the second screen 704 among the notification pages is a first page 740 of the four pages.

According to an embodiment of the present disclosure, when all items corresponding to the notification data can be displayed through the integration notification UI, the processor 120 may display the item on the integration notification UI. The first page 740 displays notification data for a missed call from Jennifer Owen. The first page 740 displays notification data for a call-related event with Jennifer Owen, who is a registered target, as a page for a call-related application. In a case of the call-related event (for example, a missed call or the like), the user may easily identify the call-related event through the integration notification UI even through only the corresponding registered target and the event generation time are displayed. That is, the notification data displayed on the first page 740 may include all items of the call-related event.

According to an embodiment of the present disclosure, the processor 120 may display the time (12:44 AM) when the corresponding event (missed call) is generated and the registered target (Jennifer Owen) related to the event on the first page 740 as illustrated in FIG. 7D, so as to provide the integration notification UI to allow the user to identify the content of the call-related event even though the user does not execute the call application.

As illustrated in FIGS. 7A to 7D, the notification pages may have various shapes and colors, and may be displayed to (translucently or opaquely) cover the home screen as layers which are distinguished from the home screen. According to an embodiment of the present disclosure, the processor 120 may control the display 160 to display the notification pages or objects corresponding to the notification pages by analyzing or processing a state of the user or the electronic device 101 in context. For example, the processor 120 may control the display 160 to display the notification pages or objects corresponding to the notification pages in consideration of a state of the user before the notification data is generated, a state of the electronic device 101 before the notification data is generated, a state of the user after the notification data is generated, or a state of the electronic device 101 after the notification data is generated.

According to an embodiment of the present disclosure, the objects (for example, first to third objects 711 to 713 and 731 to 733) may be displayed at different locations of the screen according to a state of the user who grasps the electronic device 101. For example, it may be assumed that the objects are displayed on a right side bar of the screen. When the user changes the hand grasping the electronic device 101 from the left hand to the right hand, the processor 120 may control the display 160 to move the side bar, which displays the objects, to the left side. Further, the processor 120 may move locations of the objects in up, down, left, and right directions of the screen such that the objects are not hidden by the user's hand. For example, when the objects displayed on the upper part of the right side bar of the screen are hidden by the user, the processor 120 may move the locations of the objects to the lower part of the right side bar. Further, when the screen faces the ground, that is, when the electronic device 101 is located upside down, the processor 120 may control the display 160 to display the objects in a direction toward the location of the user.

According to an embodiment of the present disclosure, the processor 120 may differently display the objects according to a current time, a place in which the electronic device 101 is located, a state of the position, or a lighting color or brightness in the place in which the electronic device 101 is located. The processor 120 may control the electronic device 101 to change and display at least one of the size, the shape, the color, and the location of each of the objects according to the current time, the place in which the electronic device 101 is located, the state of the position, the lighting color or the brightness, or a user input. Further, the processor 120 may determine the size, the shape, the color, and the location of each of the objects according to a user preference for the size, the shape, the color, and the location of each of the objects displayed on the screen.

FIGS. 8A to 8C illustrate an example of configuring a target to be managed by priority in an electronic device by the user and of an integration notification UI displayed by the electronic device according to an embodiment of the present disclosure.

FIG. 8A illustrates a first screen 801 that receives a user input 851 for configuring a new target to be managed by priority, FIG. 8B illustrates a second screen 802 that configures a target to be managed by priority according to the user input 852, and FIG. 8C illustrates a third screen 803 which displays a list of targets to be managed by priority, which have relatively higher priorities than other registered targets.

According to an embodiment of the present disclosure, when a user input for selecting the first object 711 or 731 of FIG. 7A or FIG. 7C, for example, a user input in a state where one position of the first object 711 or 731 is selected, for example, a sweep input for pushing the screen "from right to left" is received, the first screen 801 including the list of the targets to be managed by priority as illustrated in FIGS. 8A to 8C may be displayed. The user input may include a touch input (for example, including a gesture input such as a multi-touch, a swipe input, or the like) or a motion input.

According to an embodiment of the present disclosure, the first screen 801 may display an icon 810 for informing that the list of the targets to be managed by priority are displayed, targets 811 and 812 to be managed by priority, or one or more icons 820-1, 820-2, and 820-3 for additionally configuring the targets to be managed by priority may be displayed.

FIGS. 8A to 8C illustrate a case where it may be assumed that the number of targets to be managed by priority which can be configured by the electronic device 101 is five. That is, the user may register a maximum of five targets to be managed by priority in the electronic device 101.

Referring to FIG. 8A, two people are registered in the electronic device 101 as targets to be managed by priority and the user may additionally register three people as the targets to be managed by priority. The processor 120 may control the display 160 to include a thumbnail of an image indicating the target to be managed by priority, which has been already added, in the list to be managed by priority as an icon as illustrated in FIGS. 8A to 8C. Accordingly, the user may identify thumbnail images corresponding to the targets to be managed by priority, which are displayed through the display 160, to intuitively recognize the targets to be managed by priority, which are configured in the electronic device 101.

The user input 851 illustrated in FIG. 8A is for adding one target to be managed by priority. The user may add the target to be managed by priority to the electronic device 101 by making the user input 851 (for example, a touch input or the like) of selecting one of the icons 820-1, 820-2, and 820-3 for additionally configuring the target to be managed by priority in the electronic device 101.

FIG. 8B illustrates a second screen 802 for configuring the target to be managed by priority, and the second screen 802 displays a contact list stored in the electronic device 101. The user may make a user input 852 for selecting one of the contacts included in the contact list in the electronic device 101. The processor 120 may determine a registered target corresponding to the contact selected by the user input 852 as the target to be managed by priority. The user input 852 of FIG. 8B is a user input for configuring Alice Scott as the target to be managed by priority. The processor 120 may determine a new target to be managed by priority, for example, Alice Scott, by using a coordinate of a position where the user input 852 is made as illustrated in FIG. 8B.

FIG. 8C illustrates a third screen 803 in which the target to be managed by priority, which has been selected by the user, is added, and the third screen 803 may include images corresponding to the targets to be managed by priority, which have been configured in FIG. 8A, for example, first and second thumbnails 811 and 812, and a thumbnail corresponding to the target to be managed by priority, which has been selected in FIG. 8B, that is, a third thumbnail 813. Similar to FIG. 8A, the processor 120 may control the display 160 to include thumbnails 811, 812, and 813 corresponding to the targets to be managed by priority, which have been registered, and icons 820-1 and 820-2 for newly configuring the targets to be managed by priority in the third screen 803.

According to an embodiment of the present disclosure, the processor 120 may include a name, a nickname, or an image of each of the targets to be managed by priority in the list of the targets to be managed by priority or include a phone number or a mail address of each of the targets to be managed by priority in the list of the targets to be managed by priority. The display 160 may arrange and display the names, the nicknames, the phone numbers, or the mail addresses of the targets to be managed by priority as the list to be managed by priority.

According to an embodiment of the present disclosure, a user input (for example, a touch input or the like) for selecting a thumbnail (for example, an image of the target to be managed by priority or the like) corresponding to the target to be managed by priority, which indicates the configuration in the electronic device 101 as the target to be managed by priority, may be made. In this case, the processor 120 may control the electronic device 101 to perform an operation for editing information (for example, the name, the nickname, the phone number, the mail address, and the like) on the corresponding target to be managed by priority. For example, after making a user input for selecting a first thumbnail 811 among first to third thumbnails 811, 812, and 813 illustrated in FIG. 8C in the electronic device 101, the user may edit the phone number of the target to be managed by priority corresponding to the first thumbnail 811.

According to an embodiment of the present disclosure, a user input (for example, a touch input or the like) for selecting a thumbnail corresponding to the target to be managed by priority, which indicates the configuration in the electronic device 101 as the target to be managed by priority, may be made. In this case, the processor 120 may control the electronic device 101 to perform an operation for changing the corresponding target to be managed by priority. For example, after making a user input for selecting a second thumbnail 812 among first to third thumbnails 811, 812, and 813 illustrated in FIG. 8C in the electronic device 101, the user may select a person other than the target to be managed by priority corresponding to the second thumbnail 812 from the contact list illustrated in FIG. 8B, so as to delete the target to be managed by priority corresponding to the second thumbnail 812 and newly configure the person as the target to be managed by priority.

Although the integration notification UI for displaying notification data for the target to be managed by priority has been described in FIGS. 7A to 8C, the operations of the integration notification UI and the electronic device 101 of FIGS. 7A to 8C may be applied to at least one person (or object) registered in the electronic device 101 as the registered target.

Figure 8D:
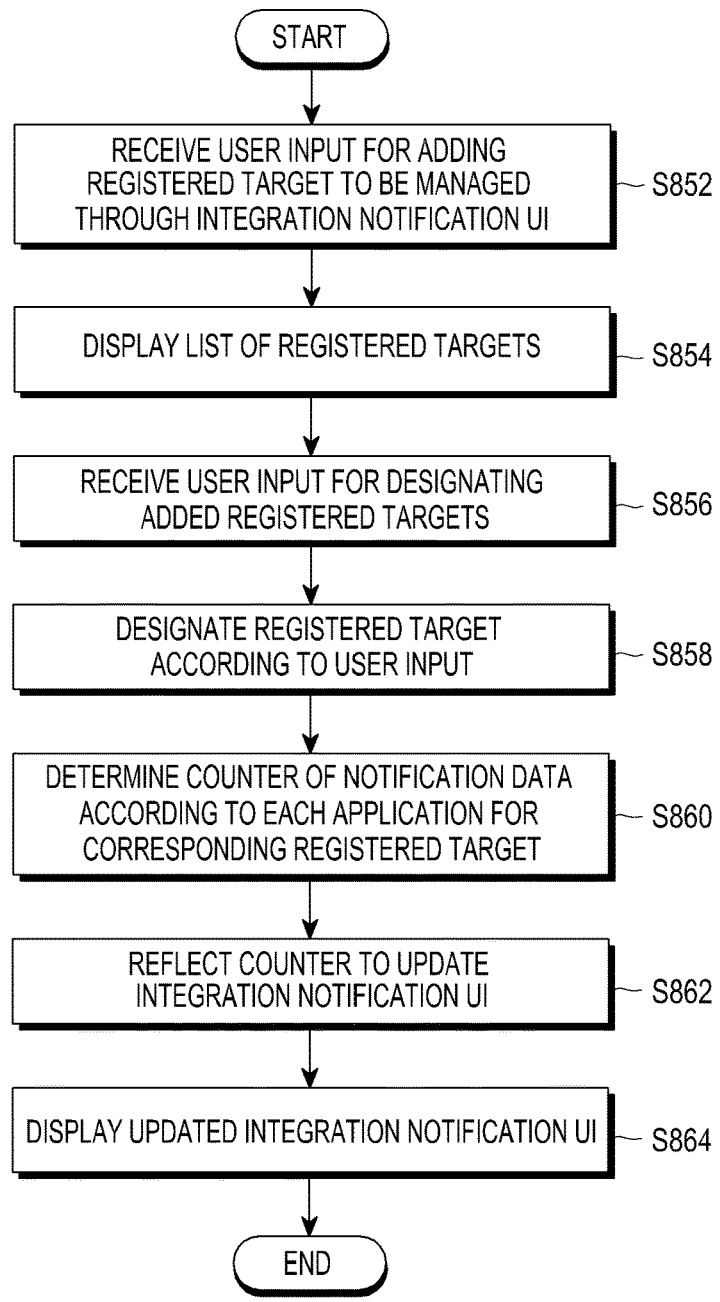
FIG. 8D is a flowchart illustrating an example of a process for configuring a registered target managed by an integration notification UI in an electronic device by a user according to an embodiment of the present disclosure.

FIG. 8D is a flowchart illustrating an example of a process for configuring a registered target managed by an integration notification UI in an electronic device by the user according to an embodiment of the present disclosure.

Referring to FIG. 8D, the electronic device 101 may receive a user input for adding a registered target to be managed through the integration notification UI in operation S852. According to an embodiment of the present disclosure, the electronic device 101 may display a screen including a list of the registered targets managed by the integration notification UI, that is, the first screen 801 according to a user input. The user may make the user input for adding the registered target in the electronic device 101 by selecting one or more icons 820-1, 820-2, and 820-3 for additionally configuring the registered target managed through the integration notification UI in the list of the registered targets.

According to a user input for designating the added registered target, the electronic device 101 may display the list of the registered targets registered in the electronic device 101, for example, a contact list in operation S854. The user may add the registered target as the target to be managed by the integration notification UI by making a user input for selecting one of the registered targets included in the list in the electronic device 101. When the user input for designating the added registered target is received in operation S856, the processor 120 may designate the registered target according to the user input in operation S858.

As described above, when the target to be registered by priority is additionally designated, the processor 120 may determine a counter of notification data according to each application for the registered target in operation S860. When the counter is determined, the processor 120 may reflect the counter to update the integration notification UI in operation S862, and display the updated integration notification UI through the display 160 in operation S864.

FIG. 9 illustrates an example of an integration notification UI displayed by an electronic device according to various embodiments of the present disclosure. It may be assumed that notification data illustrated in FIG. 9 is for the registered target Jennifer Owen.

Referring to a table 901 of FIG. 9, the processor 120 may display notification data for applications, for example, a call application, a message application, and a mail application and notification data generated by the external electronic device through the integration notification UI. In FIG. 9, the notification data for the call application may include a missed call log from Jennifer Owen, the notification data for the message application may include a message from Jennifer Owen, and the notification data for the mail application may include mail from Jennifer Owen. The notification data for the external electronic device may be data which the external electronic device shares with the electronic device 101 or a sharing count.

Referring to table 901, when the number of pieces of notification data is 1, for example, when the number of missed call logs is 1, the processor 120 may display a name (Jennifer Owen) of a sender of the missed call corresponding to the registered target or a reception time of the missed call through the integration notification UI. In table 901 of FIG. 9, through the "Missed call", information indicating that one missed call is received from Jennifer Owen is displayed. When the number of pieces of notification data is two or more, for example, when the number of missed call logs are two or more, the processor 120 may control the display 160 to display both the name (Jennifer Owen) of the sender, which is the registered target and the number of missed calls through the integration notification UI. In table 901 of FIG. 9, through "3 missed calls", information indicating that three missed calls are received from Jennifer Owen is displayed.

According to an embodiment of the present disclosure, when the number of pieces of notification data is 1, for example, when the number of messages, which have not been identified by the user, is 1, the processor 120 may display the name (Jennifer Owen) of the sender of the message corresponding to the name of the registered target or at least a part of the message through the integration notification UI. In table 901 of FIG. 9, through "Did you get my message? I'm on my way now. See you in 5 mins", the full text of the message from Jennifer Owen is displayed. When the number of pieces of notification data is two or more, for example, when the number of messages, which have not been identified by the user, is two or more, the processor 120 may control the display 160 to display both the name (Jennifer Owen) of the sender corresponding to a target to be alarmed by priority and the number of unidentified messages. In table 901 of FIG. 9, through "3 messages", information indicating that three messages are received from Jennifer Owen is displayed.

According to an embodiment of the present disclosure, when the number of pieces of notification data is 1, for example, when the number of mails, which have not been identified by the user, is 1, the processor 120 may display the name (Jennifer Owen) of the sender corresponding to the name of the registered target or at least a part of the mail content through the integration notification UI. In the table 901 of FIG. 9, at least a part of the mail content such as "Hello all, this is Jennifer Owen" is displayed as well as a title of the mail such as "[Urgent] User experience (UX) meeting notice (4 pm)." When the number of pieces of notification data is two or more, for example, when the number of mails, which have not been identified by the user, is two or more, the processor 120 may control the display 160 to display both the name (Jennifer Owen) of the sender corresponding to the registered target and the number of unidentified mails. In table 901 of FIG. 9, through "3 new mails", information indicating that three messages are received from Jennifer Owen is displayed.

According to an embodiment of the present disclosure, when the external electronic device (for example, the first electronic device 103 or 104) is connected to the electronic device 101, the processor 120 may control the display 160 to display data shared with the external electronic device or the number of times by which the data is shared with the external electronic device through the integration notification UI.

Further, although not illustrated in FIG. 9, the processor 120 may divide the notification page into at least two areas. The processor 120 may control the display 160 to display recently generated notification data in a first area of at least two areas and display a counter according to each application or each registered target in a second area.

Referring to table 901 of FIG. 9, the processor 120 may display the name (Jennifer Owen) of the registered target and an image of the registered target, so as to display and provide the registered target to be intuitively recognized by the user of the electronic device 101. Referring to table 901 of FIG. 9, by displaying "Received 32 Music files" as the part of the notification data, information indicating that the external device receives 32 music files from Jennifer Owen is displayed. When the number of pieces of notification data is two or more, the processor 120 may control the display 160 to display both the name (Jennifer Owen) of the sender corresponding to the registered target and the number of pieces of notification data. In the table 901 of FIG. 9, by displaying "Shared 3 times", information indicating that the external electronic device is connected to Jennifer Owen three times and accordingly three pieces of notification data for notifying that the electronic device 101 is connected to Jennifer Owen are generated is displayed.

According to an embodiment of the present disclosure, the processor 120 may distinguish the type of data received from or shared with the external electronic device (for example, the electronic device 103 or 104). When the data is received from or shared with the external electronic device, the processor 120 may generate notification data for the reception or sharing of the data. At this time, the processor 120 may insert the type of the received or shared data (for example, music, picture, movie, document, dynamic image, and the like) into the notification data. For example, when the electronic device 101 shares 20 picture files with the external electronic device, the processor 120 may generate notification data for informing that the 20 files have been shared with the external electronic device and the corresponding files are the picture files.

Figure 10A:
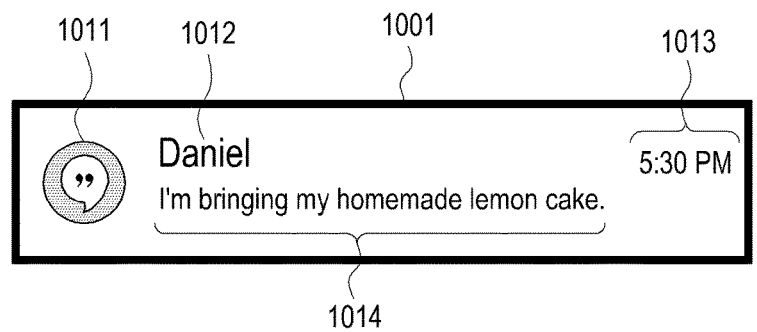
FIGS. 10A and 10B illustrate an example of an integration notification UI displayed by an electronic device according to various embodiments of the present disclosure.
Figure 10B:
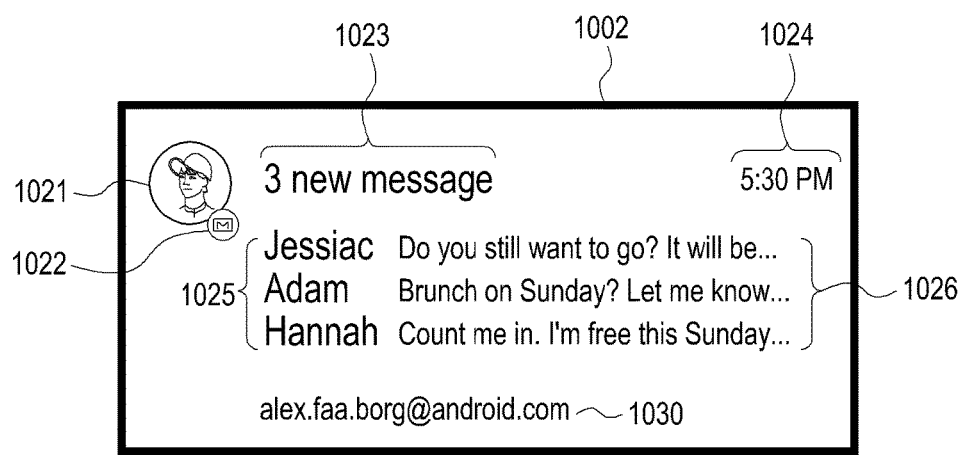

FIGS. 10A and 10B illustrate an example of an integration notification UI displayed by an electronic device according to various embodiments of the present disclosure.

FIGS. 10A and 10B illustrate an integration notification UI that informs of reception of a message. In more detail, FIG. 10A illustrates an integration notification UI in a case where the number of messages, which have not been identify by the user when there is one piece of notification data, and FIG. 10B illustrates an integration notification UI in a case where the number of messages, which have not been identified by the user, is two or more when the number of pieces of notification data is two or more.

Referring to FIG. 10A, a notification page 1001 of the integration notification UI may include and display an icon 1011 for indicating that the corresponding event is related to a message, a sender 1012 of the message, a reception time 1013 of the message, or the message content 1014. According to an embodiment of the present disclosure, when the number of pieces of notification data is 1 as illustrated in FIG. 10A, the processor 120 may display an item related to the corresponding event on the notification page 1001. In FIG. 10A, an entirety of the content 1014 of the unidentified message is displayed. According to an embodiment of the present disclosure, the message content 1014 may not be displayed on the notification page 1001, or a part (for example, 20 characters or less) of the message content 1014 may be displayed.

Referring to FIG. 10B, a notification page 1002 of the integration notification UI may include a thumbnail 1021 indicating the registered target, an icon 1022 indicating an application (for example, a mail application) related to the corresponding events, the number 1023 of pieces of notification data, a time 1024 related to the notification data (for example, a reception time of the first received mail among the corresponding mails or a reception time of the lastly received mail). Further, the notification page 1002 may include registered target 1025 related to the corresponding events and the mail content 1026 according to each registered target as a list of the notification data.

According to an embodiment of the present disclosure, the notification page 1002 may include and display contact information, for example, a mail address 1030 of the registered target related to the notification data displayed through the notification page 1002.

FIGS. 11A to 11D illustrate an example of storing contacts by an electronic device according to various embodiments of the present disclosure.

The contacts of FIGS. 11A to 11D may correspond to the part of information on the registered targets.

Figures 11D, 12A:
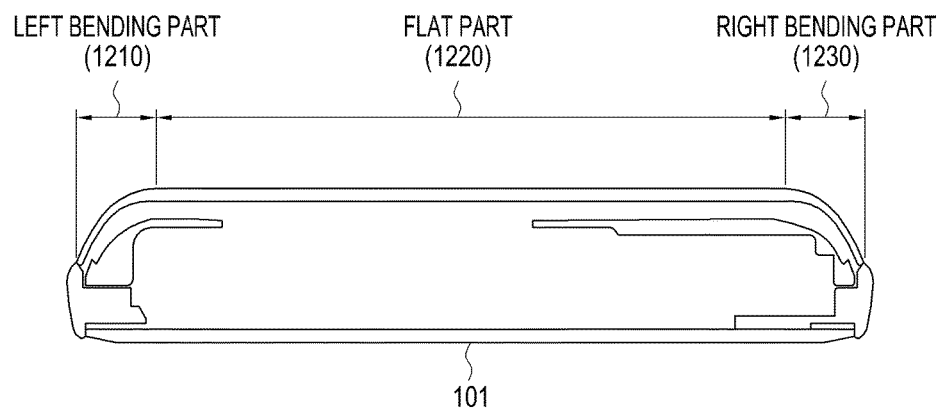

FIGS. 11A to 11C illustrate a case where contact information is overlappingly stored and FIG. 11D illustrates a case where the processor 120 integrates the overlappingly stored contact information of FIGS. 11A and 11B.

FIGS. 11A to 11C all illustrate contact information on a user having a name of "Hong Gil Dong." Phone number 1 and a nickname of Hong Gil Dong are shown in a table 1111 of FIG. 11A, phone number 1 and a mail address of Hong Gil Dong are shown in a table 1112 of FIG. 11B, and phone numbers 1 and 2 of Hong Gil Dong are shown in a table 1113 of FIG. 11C. Contact information on the same user may be overlappingly stored in the electronic device 101 as illustrated in FIGS. 11A to 11C.

According to an embodiment of the present disclosure, the processor 120 may integrate FIGS. 11A to 11C into one piece of contact information. According to an embodiment of the present disclosure, the processor 120 may compare contact information stored with the same name or similar names. For example, a user name included in the contact information 1111 of FIG. 11A is "Hong Gil Dong R" and a user name included in the contact information 1112 of FIG. 11B is "Hong Gil Dong." Since the user name of the contact information 1111 of FIG. 11A is similar to the user name of the contact information 1112 of FIG. 11B and phone number 1 of the contact information 1111 and phone number 1 of contact information 1112 are the same, the processor 120 may determine the contact information 1111 and 1112 of FIG. 11A and FIG. 11B as the same contact information. Similarly, the user name (Hong Gil Dong) of contact information 1113 of FIG. 11C is similar to the user name (Hong Gil Dong R) included in the contact information 1111 of FIG. 11A, and the user names (Hong Gil Dong) of contact information 1112 and 1113 of FIG. 11B) and FIG. 11C are the same. Further, phone number 2 of the contact information 1113 of FIG. 11C is the same as phone number 1 included in the contact information 1111, 1112, and 1113 of FIGS. 11A to 11C. Based on a result of the comparison, the processor 120 may determine all the contact information 1111, 1112, and 1113 of FIGS. 11A to 11C as the contact information on the same person (Hong Gil Dong). By merging the contact information on the same person as described above, the processor 120 may update the contact DB 230. According to an embodiment of the present disclosure, the processor 120 may update the contact DB 230 by merging contact information on the same person as described above at every configured time or according to a user input.

According to an embodiment of the present disclosure, the processor 120 may integrate the contact information 1111, 1112, and 1113 of FIGS. 11A-11C into one piece of contact information 1120 as illustrated in FIG. 11D. The integrated contact information 1120 may include all data included in each of the contact information 1111, 1112, and 1113. Accordingly, the contact information 1120 of FIG. 11D includes all of phone number 1, phone number 2, nickname, and mail address. When the overlapping contact information 1111, 1112, and 1113 are integrated into one piece of contact information 1120 as described above, the processor 120 may leave the one piece of integrated contact information 1120 and delete the remaining overlapping contact information 1111, 1112, and 1113 from the memory 130. According to an embodiment of the present disclosure, even though the overlapping contact information 1111, 1112, and 1113 are integrated into one piece of contact information 1120, the processor 120 may maintain the overlapping contact information 1111, 1112, and 1113 without deleting the overlapping contact information 1111, 1112, and 1113.

Hereinafter, the contact information 1120 of FIG. 11D will be described as an example. According to an embodiment of the present disclosure, the processor 120 may generate or update the contact information 1120. For example, in a case of the contact information 1120 of FIG. 11D, the processor 120 may receive each item such as a user name (Hong Gil Dong), one or more phone numbers (010-8145-2145 and 010-7411-2145), a nickname (silver), and a mail address (asd@gmail.com) as a user input through the input/output interface 150. The processor 120 may generate the contact information 1120 including the items input by the user.

According to an embodiment of the present disclosure, the processor 120 may update the contact information 1120 by adding a value of one of the items included in the contact information 1120. For example, the processor 120 may update the contact information 1120 by adding phone number 3.

According to an embodiment of the present disclosure, when the number of pieces of data of the same item is two or more, the processor 120 may assign a priority to each of the data. For example, the contact information 1120 of FIG. 11D includes two phone numbers, that is, phone number 1 (010-8145-2145) and phone 2 (010-7411-2145). The processor 120 may assign different priorities to phone number 1 and phone number 2. At this time, the processor 1020 may assign a higher priority to a more frequently used phone number. According to an embodiment of the present disclosure, the priority of each of phone number 1 and phone 2 may be determined by the user of the electronic device 101. According to an embodiment of the present disclosure, the processor 120 may delete the phone number, which has not been used for a preset period (for example, 6 months) among the two phone numbers from the contact information 1120. For example, when phone number 1 between phone number 1 and phone number 2 has not been used for a preset period (for example, 6 months), the processor 120 may delete phone number 1 from the contact information 1120.

According to an embodiment of the present disclosure, when the electronic device 101 receives a message for informing that the contact of the registered target of which contact information 1120 is stored is changed, the processor 120 may correct the contact information on the registered target. For example, it may be assumed that the electronic device 101 receives a notification message having the content of "the phone number of Hong Gil Dong is changed to "010-8145-2145" from the sender of "Hong Gil Dong." The processor 120 may parse the notification message to extract keywords such as "Hong Gil Dong", "phone number", "010-8145-2145" or "changed" from the notification message. Further, the processor 120 may know that the phone number of the contact information corresponding to the sender of the notification message has been changed through the keywords.

When the contact information on the registered target is changed as described above, the processor 120 may control the electronic device 101 to manage the notification data before the contact is changed and the notification data after the contact is changed through merger therebetween. For example, it may be assumed that the number of pieces of notification data generated before the contact information on the registered target is changed is three and the number of pieces of notification data generated after the contact information is changed is two. The notification service block 220 of the processor 120 may determine the number of pieces of notification data as five since the notification data before the change is the notification data on the registered target even though the contact information is changed. Further, the processor 120 may control the electronic device 101 to display five pieces of notification data generated before and after the change in the contact information together.

According to an embodiment of the present disclosure, the processor 120 may generate notification data for informing of the change in the contact information. The processor 120 may change attributes of the notification data such that the notification data before the contact information is changed corresponds to the changed contact information.

According to an embodiment of the present disclosure, the processor 120 may update the contact information by changing the phone number in the contact information on the sender (Hong Gil Dong) stored in the electronic device 101 into a phone number included in a notification message. According to an embodiment of the present disclosure, when the electronic device 101 receives the notification message, the processor 120 may add the phone number included in the notification message to the contact information on the sender. At this time, the processor 120 may determine each of a priority of the phone number included in the notification message and a priority of the phone number included in the contact information. For example, the processor 120 may assign a higher priority to the phone number included in the notification message rather than the phone number included in the contact information.

FIGS. 12A to 12E illustrate an electronic device according to various embodiments of the present disclosure.

FIG. 12A illustrates a side surface of the electronic device 101.

Referring to FIG. 12A, the electronic device 101 may include a left bending part (or a left curved part) 1210, a flat part 1220, and a right bending part (or a right curved part) 1230. The left bending part 1210 and the right bending part 1230 may be located at right and left side surfaces of the electronic device 101 and may be formed with curved surfaces. Further, the flat part 1220 may be located at the center of the electronic device 101 and may be formed with a flat surface. Each of the left bending part 1210 and the right bending part 1230 may include a constant having a predetermined radius of curvature or successive radius of curvature. Further, the flat part 1220 may be a flat area including a part of the curvature.

According to an embodiment of the present disclosure, the objects 711 to 713 illustrated in FIGS. 7A to 7B or notification data may be displayed on the left bending part 1210 or the right bending part 1230. According to an embodiment of the present disclosure, the objects 711 to 713 or the notification data may be displayed on at least the part of the flat part 1220.

According to an embodiment of the present disclosure, when the notification data or the objects 711 to 713, displayed on the left bending part 1210 are hidden by the user or an object adjacent to the electronic device 101, the processor 120 may control the electronic device 101 to display the notification data or the objects on the flat part 1220 or the right bending part 1230. According to an embodiment of the present disclosure, when the notification data or the objects 711 to 713, displayed on the right bending part 1230 are hidden by the user or an object adjacent to the electronic device 101, the processor 120 may control the electronic device 101 to display the notification data or the objects on the left bending part 1210 or the flat part 1220. According to an embodiment of the present disclosure, when the notification data or the objects 711 to 713, displayed on the flat part 1220 are hidden by the user or an object adjacent to the electronic device 101, the processor 120 may control the electronic device 101 to display the notification data or the objects on the left bending part 1210 or the right bending part 1230.

FIGS. 12B to 12E illustrate a front surface of an electronic device having the cross section of FIG. 12A. Referring to FIG. 12A, the electronic device 101 may include the left bending part 1210, the flat part 1220, and the right bending part 1230. The left bending part 1210 and the right bending part 1230 may be located at right and left side surfaces of the electronic device 101 and may be formed with curved surfaces. Further, the flat part 1220 may be located at the center of the electronic device 101 and may be formed with a flat surface.

FIG. 12B illustrates the electronic device 101 in which the left bending part 1210, the flat part 1220, and the right bending part 1230 are configured as one display. FIG. 12C illustrates the electronic device 101 in which, among the left bending part 1210, the flat part 1220, and the right bending part 1230, the flat part 1220 and the right bending part 1230 correspond to one display and the left bending part 1210 corresponds to another display. That is, the electronic device 101 illustrated in FIG. 12C includes two displays. The electronic device 101 illustrated in FIG. 12D corresponds to the electronic device 101 in which the left bending part 1210 and the flat part 1220 correspond to one display and the right bending part 1230 corresponds to another display. That is, FIG. 12D includes two displays. FIG. 12E illustrates the electronic device 101 in which the left bending part 1210, the flat part 1220, and the right bending part 1230 correspond to different displays, respectively. That is, the electronic device 101 illustrated in FIG. 12E includes three displays.

In the electronic device 101 configured as illustrated in FIG. 12B, notification data or the integration notification UI may be displayed in any area of the left bending part 1210, the flat part 1220, and the right bending part 1230, may be displayed over the left bending part 1210 and the flat part 1220 or the right bending part 1230 and the flat part 1220, or may be displayed on all over the left bending part 1210, the flat part 1220, and the right bending part 1230.

In the electronic device 101 illustrated in FIG. 12C, the notification data or the integration notification UI may be displayed in any area of the left bending part 1210, the flat part 1220, or the right bending part 1230 and may be displayed over the right bending part 1230 and the flat part 1220. Further, the notification data or the integration notification UI may be displayed through the display configuring the left bending part 1210 even though power of the display configuring the right bending part 1230 and the flat part 1220 is turned off.

In the electronic device 101 illustrated in FIG. 12D, the notification data or the integration notification UI may be displayed in any area of the left bending part 1210, the flat part 1220, or the right bending part 1230 and may be displayed over the left bending part 1210 and the flat part 1220. Further, the notification data or the integration notification UI may be displayed through the display configuring the right bending part 1230 even though power of the display configuring the left bending part 1210 and the flat part 1220 is turned off.

In the electronic device 101 illustrated in FIG. 12E, the notification data or the integration notification UI may be displayed in any area of the left bending part 1210, the flat part 1220, or the right bending part 1230. Further, even though power of at least one of the displays configuring the left bending part 1210, the flat part 1220, and the right bending part 1230 is turned off, if power of at least one other display is turned on, the notification data or the integration notification UI may be displayed through the corresponding display. For example, when power of the left bending part 1210 and the flat part 1220 is turned off, the processor 120 may display the integration notification UI through the right bending part 1230. When power of the flat part 1220 is turned off, the processor 120 may display the integration notification UI through the left bending part 1210 or the right bending part 1230.

Figure 13:
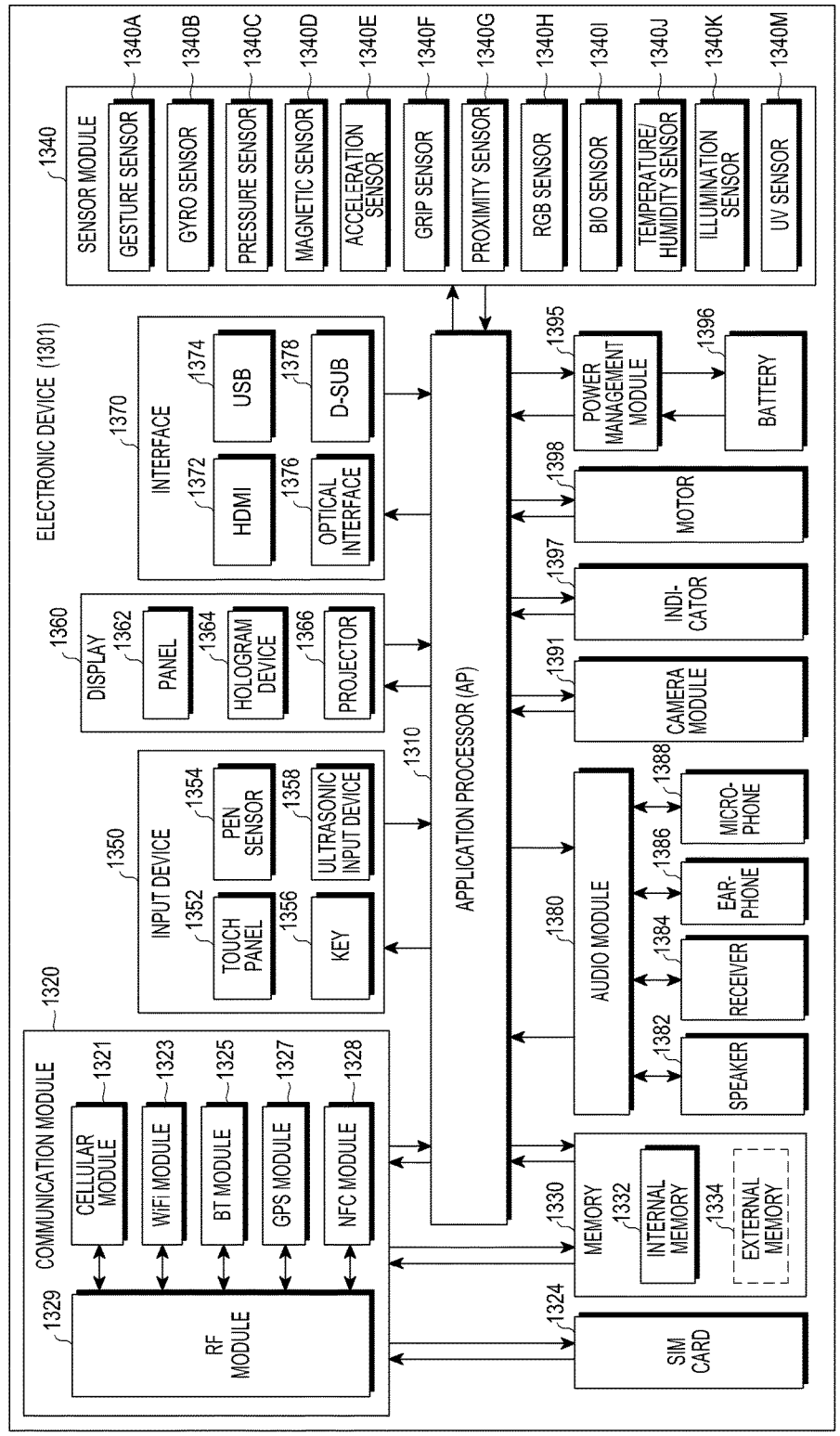
FIG. 13 is a block diagram of an electronic device according to various embodiments of the present disclosure.

FIG. 13 is a block diagram of an electronic device according to various embodiments of the present disclosure.

Referring to FIG. 13, an electronic device 1301 may include, for example, an entirety or part of the electronic device 101 illustrated in FIG. 1. The electronic device 1301 may include at least one processor (for example, an AP) 1310, a communication module 1320, a subscriber identification module (SIM) 1324, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may control a plurality of hardware or software elements connected to the processor 1310 by running, for example, an OS or an application program, and may perform processing and arithmetic operations of various types of data. The processor 1310 may be implemented by, for example, a system on chip (SoC). According to an embodiment of the present disclosure, the processor 1310 may further include a graphics processing unit (GPU) and/or an image signal processor (ISP). The processor 1310 may include at least some (for example, a cellular module 1321) of the components illustrated in FIG. 13. The processor 1310 may load, into a volatile memory, commands or data received from at least one (for example, a non-volatile memory) of the other components, process the loaded commands or data, and store various data in a non-volatile memory.

The communication module 1320 may have a configuration equal or similar to that of the communication interface 170 of FIG. 1. The communication module 1320 may include, for example, a cellular module 1321, a Wi-Fi module 1323, a BT module 1325, a GNSS module 1327 (for example, a GPS module, a GLONASS module, a BeiDou module, or a Galileo module), an NFC module 1328, and a radio frequency (RF) module 1329.

For example, the cellular module 1321 may provide a voice call, an image call, a text message service, an Internet service, and the like through a communication network. According to an embodiment of the present disclosure, the cellular module 1321 may distinguish between and authenticate electronic devices 1301 within a communication network by using a SIM 1324 (for example, the SIM card). According to an embodiment of the present disclosure, the cellular module 1321 may perform at least some of the functions that the processor 1310 may provide. According to an embodiment of the present disclosure, the cellular module 1321 may include a CP.

Each of the Wi-Fi module 1323, the BT module 1325, the GNSS module 1327, and the NFC module 1328 may include, for example, a processor for processing data transmitted and received through the corresponding module. According to various embodiments of the present disclosure, at least some (for example, two or more) of the cellular module 1321, the Wi-Fi module 1323, the BT module 1325, the GNSS module 1327, and the NFC module 1328 may be included in one integrated chip (IC) or IC package.

The RF module 1329 may transmit/receive, for example, a communication signal (for example, an RF signal). The RF module 1329 may include, for example, a transceiver, a power amplifier module (PAM), a frequency filter, a low noise amplifier (LNA), or an antenna. According to an embodiment of the present disclosure, at least one of the cellular module 1321, the Wi-Fi module 1323, the BT module 1325, the GNSS module 1327, and the NFC module 1328 may transmit and receive RF signals through a separate RF module.

The SIM 1324 may include, for example, a card including a subscriber identity module and/or an embedded SIM, and may contain unique identification information (for example, an IC card ID (ICCID)) or subscriber information (for example, an international mobile subscriber identity (IMSI)).

The memory 1330 (for example, the memory 130) may include, for example, an internal memory 1332 or an external memory 1334. The internal memory 1332 may include at least one of a volatile memory (for example, a dynamic random access memory (DRAM), a static RAM (SRAM), a synchronous DRAM (SDRAM), and the like) and a non-volatile memory (for example, a one time programmable read only memory (OTPROM), a PROM, an erasable PROM (EPROM), an electrically EPROM (EEPROM), a mask ROM, a flash ROM, a flash memory (for example, a NAND flash memory or a NOR flash memory), a hard disk drive, a solid state drive (SSD), and the like).

The external memory 1334 may further include a flash drive, for example, a compact flash (CF), a secure digital (SD), a micro-SD, a mini-SD, an extreme digital (xD), a memory stick, or the like. The external memory 1334 may be functionally and/or physically connected to the electronic device 1301 through various interfaces.

The sensor module 1340 may measure a physical quantity or detect an operation state of the electronic device 1301, and may convert the measured or detected information into an electrical signal. The sensor module 1340 may include, for example, at least one of a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor 1340H (for example, a red, green, blue (RGB) sensor), a biometric sensor 1340I, a temperature/humidity sensor 1340J, a light sensor 1340K, and an ultraviolet (UV) sensor 1340M. Additionally or alternatively, the sensor module 1340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling one or more sensors included therein. According to various embodiments of the present disclosure, the electronic device 1301 may further include a processor configured to control the sensor module 1340 as a part of or separately from the processor 1310, and may control the sensor module 1340 while the processor 1310 is in a sleep state.

The input device 1350 may include, for example, a touch panel 1352, a (digital) pen sensor 1354, a key 1356, or an ultrasonic input device 1358. The touch panel 1352 may use at least one of, for example, a capacitive type, a resistive type, an IR type, and an ultrasonic type. Also, the touch panel 1352 may further include a control circuit. The touch panel 1352 may further include a tactile layer and provide a tactile reaction to the user.

The (digital) pen sensor 1354 may include, for example, a recognition sheet which is a part of the touch panel or is separated from the touch panel. The key 1356 may include, for example, a physical button, an optical key or a keypad. The ultrasonic input device 1358 may detect ultrasonic wavers generated by an input tool through a microphone (for example, a microphone 1388) and identify data corresponding to the detected ultrasonic waves.

The display 1360 (for example, the display 160) may include a panel 1362, a hologram device 1364 or a projector 1366. The panel 1362 may include a configuration identical or similar to that of the display 160 illustrated in FIG. 1. The panel 1362 may be implemented to be, for example, flexible, transparent, or wearable. The panel 1362 and the touch panel 1352 may be implemented as one module. The hologram device 1364 may show a three dimensional image in the air by using an interference of light. The projector 1366 may display an image by projecting light onto a screen. The screen may be located, for example, inside or outside the electronic device 1301. According to an embodiment of the present disclosure, the display 1360 may further include a control circuit for controlling the panel 1362, the hologram device 1364, or the projector 1366.

The interface 1370 may include, for example, an HDMI 1372, a USB 1374, an optical interface 1376, or a D-subminiature (D-sub) 1378. The interface 1370 may be included in, for example, the communication interface 170 illustrated in FIG. 1. Additionally or alternatively, the interface 1370 may include, for example, a mobile high-definition link (MHL) interface, an SD card/multi-media card (MMC) interface, or an infrared data association (IrDA) standard interface.

For example, the audio module 1380 may bidirectionally convert between a sound and an electrical signal. At least some elements of the audio module 1380 may be included in, for example, the input/output interface 150 illustrated in FIG. 1. The audio module 1380 may process sound information which is input or output through, for example, a speaker 1382, a receiver 1384, an earphone 1386, the microphone 1388, or the like.

The camera module 1391 is a device which may photograph a still image and a dynamic image. According to an embodiment of the present disclosure, the camera module 1391 may include one or more image sensors (for example, a front sensor or a back sensor), a lens, an ISP or a flash (for example, LED or xenon lamp).

The power management module 1395 may manage, for example, power of the electronic device 1301. According to an embodiment of the present disclosure, the power management module 1395 may include a power management IC (PMIC), a charger IC (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (for example, a coil loop, a resonance circuit, a rectifier, etc.) for wireless charging may be further included. The battery gauge may measure, for example, a residual quantity of the battery 1396, and a voltage, a current, or a temperature during the charging. The battery 1396 may include, for example, a rechargeable battery or a solar battery.

The indicator 1397 may display a particular state (for example, a booting state, a message state, a charging state, or the like) of the electronic device 1301 or a part (for example, the processor 1310) of the electronic device 1301. The motor 1398 may convert an electrical signal into mechanical vibration, and may generate vibration, a haptic effect, or the like. Although not illustrated, the electronic device 1301 may include a processing unit (for example, a GPU) for supporting a mobile TV. The processing unit for supporting mobile TV may process, for example, media data according to a certain standard such as digital multimedia broadcasting (DMB), digital video broadcasting (DVB), or MediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 14:
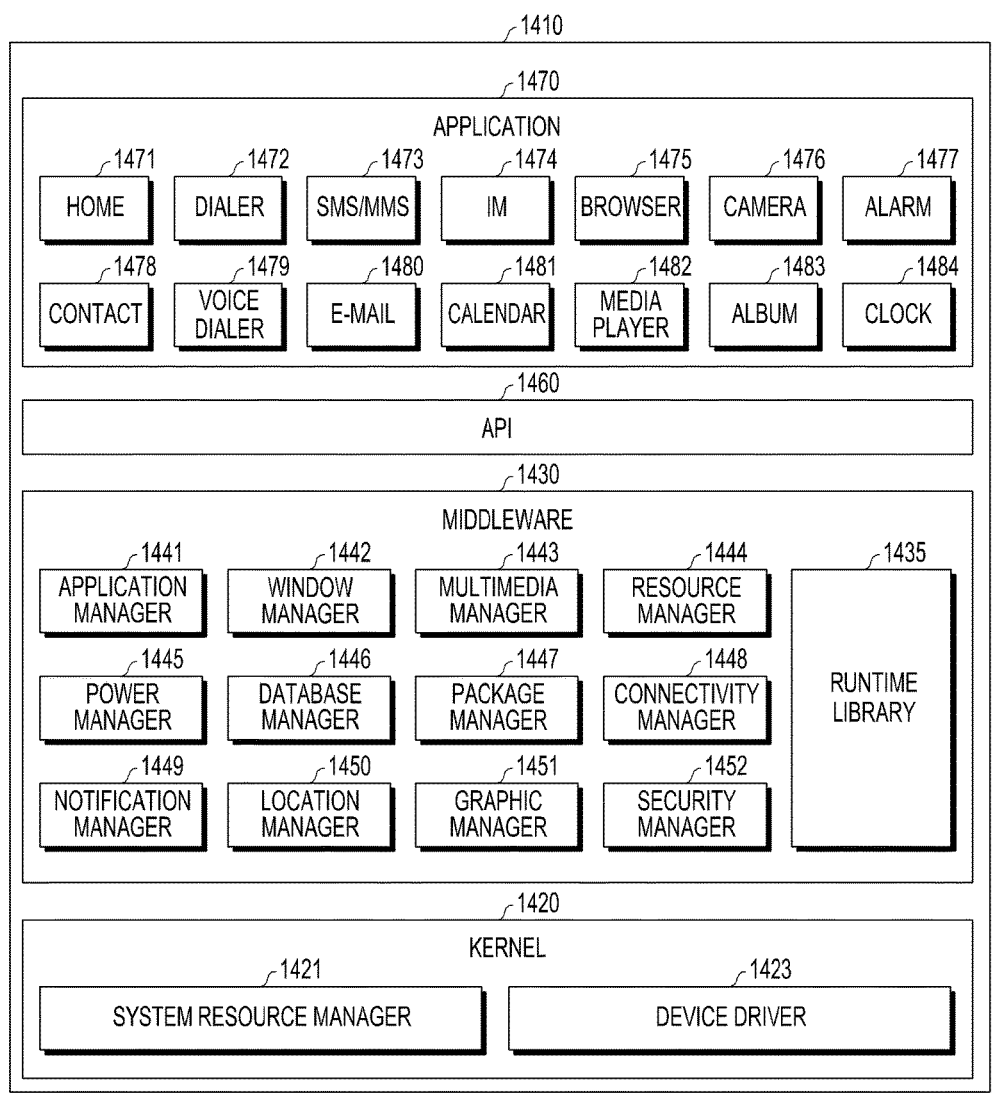
FIG. 14 is a block diagram of a program module according to various embodiments of the present disclosure.

FIG. 14 is a block diagram of a program module according to various embodiments of the present disclosure.

According to an embodiment of the present disclosure, the program module 1410 (for example, the program 140) may include an OS for controlling resources related to the electronic device (for example, the electronic device 101) and/or various applications (for example, the application program 147) executed in the OS. The OS may be, for example, Android, iOS, Windows, Symbian, Tizen, Bada, or the like.

Referring to FIG. 14, the program module 1410 may include a kernel 1420, middleware 1430, an API 1460, and/or an application 1470. At least some of the program module 1410 may be preloaded on the electronic device, or may be downloaded from an external electronic device (for example, the electronic device 103 or 104, or the server 106).

The kernel 1420 (for example, the kernel 141) may include, for example, a system resource manager 1421 and/or a device driver 1423. The system resource manager 1421 may control, allocate, or collect system resources. According to an embodiment of the present disclosure, the system resource manager 1421 may include a process manager, a memory manager, a file system manager, or the like. The device driver 1423 may include, for example, a display driver, a camera driver, a BT driver, a shared memory driver, a USB driver, a keypad driver, a Wi-Fi driver, an audio driver, or an inter-process communication (IPC) driver.

The middleware 1430 may provide a function required by the applications 1470 in common or provide various functions to the applications 1470 through the API 1460 so that the applications 1470 can efficiently use limited system resources within the electronic device. According to an embodiment of the present disclosure, the middleware 1430 (for example, the middleware 143) may include, for example, at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, and a security manager 1452.

The runtime library 1435 may include a library module that a compiler uses in order to add a new function through a programming language while the applications 1470 are being executed. The runtime library 1435 may perform input/output management, memory management, the functionality for an arithmetic function, or the like.

The application manager 1441 may manage, for example, a life cycle of at least one of the applications 1470. The window manager 1442 may manage graphical UI (GUI) resources used for the screen. The multimedia manager 1443 may determine a format required to reproduce various media files, and may encode or decode a media file by using a coder/decoder (codec) appropriate for the corresponding format. The resource manager 1444 may manage resources, such as a source code, a memory, a storage space, and the like of at least one of the applications 1470.

The power manager 1445 may operate together with a basic input/output system (BIOS) to manage a battery or power and may provide power information required for the operation of the electronic device. The database manager 1446 may generate, search for, and/or change a database to be used by at least one of the applications 1470. The package manager 1447 may manage the installation or update of an application distributed in the form of a package file.

The connectivity manager 1448 may manage a wireless connection such as, for example, Wi-Fi or BT. The notification manager 1449 may display or notify of an event, such as an arrival message, an appointment, a proximity notification, and the like, in such a manner as not to disturb the user. The location manager 1450 may manage location information of the electronic device. The graphic manager 1451 may manage a graphic effect, which is to be provided to the user, or a user interface related to the graphic effect. The security manager 1452 may provide various security functions required for system security, user authentication, and the like. According to an embodiment of the present disclosure, when the electronic device (for example, the electronic device 101) has a telephone call function, the middleware 1430 may further include a telephony manager for managing a voice call function or a video call function of the electronic device.

The middleware 1430 may include a middleware module that forms a combination of various functions of the above-described elements. The middleware 1430 may provide modules specialized according to the type of OSs in order to provide differentiated functions. Also, the middleware 1430 may dynamically delete some of the existing elements, or may add new elements.

The API 1460 (for example, the API 145) is a set of API programming functions and may be provided with a different configuration according to OSs. For example, in the case of Android or iOS, one API set may be provided for each platform. In the case of Tizen, two or more API sets may be provided for each platform.

The applications 1470 (for example, the application program 147) may include, for example, one or more applications which can provide functions such as home 1471, dialer 1472, SMS/MMS 1473, instant message (IM) 1474, browser 1475, camera 1476, alarm 1477, contacts 1478, voice dialer 1479, email 1480, calendar 1481, media player 1482, album 1483, clock 1484, health care (for example, measure exercise quantity or blood sugar), or environment information (for example, atmospheric pressure, humidity, or temperature information).

According to an embodiment of the present disclosure, the applications 1470 may include an application (hereinafter, referred to as an "information exchange application" for convenience of description) supporting information exchange between the electronic device (for example, the electronic device 101) and an external electronic device (for example, the electronic device 103 or 104). The application associated with information exchange may include, for example, a notification relay application for forwarding specific information to an external electronic device, or a device management application for managing an external electronic device.

For example, the notification relay application may include a function of delivering, to the external electronic device (for example, the electronic device 102 or 104), notification information generated by other applications (for example, an SMS/MMS application, an e-mail application, a health care application, an environmental information application, and the like) of the electronic device 101. Further, the notification relay application may receive notification information from, for example, an external electronic device and provide the received notification information to a user.

For example, the device management application may manage (for example, install, delete, or update) at least one function of an external electronic device (for example, the electronic device 103 or 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment of the present disclosure, the applications 1470 may include applications (for example, a health care application of a mobile medical device or the like) designated according to attributes of the external electronic device 103 or 104. According to an embodiment of the present disclosure, the application 1470 may include an application received from the external electronic device (for example, the server 106, or the electronic device 103 or 104). According to an embodiment of the present disclosure, the application 1470 may include a preloaded application or a third party application which can be downloaded from the server. Names of the elements of the program module 1410, according to the above-described embodiments of the present disclosure, may change depending on the type of OS.

According to various embodiments of the present disclosure, at least some of the program module 1410 may be implemented in software, firmware, hardware, or a combination of two or more thereof. At least some of the program module 1410 may be implemented (e.g., executed) by, for example, the processor (e.g., the processor 1310). At least some of the program module 1410 may include, for example, a module, a program, a routine, a set of instructions, and/or a process for performing one or more functions.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an application-specific IC (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a compact disc ROM (CD-ROM) and a DVD), magneto-optical media (for example, a floptical disk), a hardware device (for example, a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing an integration notification by an electronic device, the method comprising:
    receiving notification data associated with a plurality of events generated by a plurality of application programs;
    identifying registered contact associated with the events with reference to a contact database;
    classifying the received notification data according to the identified registered contact;
    displaying a plurality of objects in some areas of a touch screen, each of the plurality of objects being associated with a different registered contact respectively; and
    displaying a notification page on the touch screen in response to a first user input for selecting at least one object among the plurality of objects, the notification page including the classified notification data being associated with the registered contact corresponding to the selected object among the plurality of objects,
    wherein the selected object is expanded to the notification page, and
    wherein the notification data included on the notification page comprises an image, an icon, or a text indicating a plurality of application programs stored in the memory and a counter of the information associated with each of the plurality of application programs being displayed in the notification page.

2. The method of claim 1, wherein the touch screen is substantially a rectangle, the rectangle including a first periphery and a second periphery shorter than the first periphery, and the plurality of objects are arranged along the first periphery.

3. The method of claim 1, wherein the touch screen includes a flat part and a curved part extended from the flat part, and the plurality of objects are arranged on the curved part.

4. The method of claim 1, wherein an image and information are simultaneously displayed in the notification page, the image being stored within a memory, and the information being associated with contact information of the registered contact.

5. The method of claim 4, wherein at least one of an image, an icon, or a text indicating at least one of application programs stored in the memory and a counter of the information associated with each of the application programs is displayed in at least one of the notification page.

6. The method of claim 5, further comprising:
    receiving a second user input received through the at least one of the notification page; and
    displaying at least one of an image, an icon, or a text indicating a second application program among the application programs stored in the memory or a counter of the information associated with the second application program in response to the second user input.

7. The method of claim 1, wherein each of the plurality of objects have different colors or shapes.

8. The method of claim 1, wherein the first user input is a gesture input on the touch screen.

9. The method of claim 1 further comprising:
    displaying an icon or a user interface of at least one application program in another area of the touch screen simultaneously with the the plurality of objects.

10. An electronic device comprising:
    a display comprising a touch screen; and
    a processor configured to:
        receive notification data associated with a plurality of events generated by a plurality of application programs,
        identifying registered contact associated with the events with reference to a contact database,
        classify the received notification data according to the identified registered contact,
        control the display to display a plurality of objects in some areas of the touch screen, each of the plurality of objects being associated with a different registered contact respectively, and
        control the display to display a notification page on the touch screen in response to a first user input for selecting at least one object among the plurality of objects, the notification page including the classified notification data being associated with the registered contact corresponding to the selected object among the plurality of objects,
    wherein the selected object is expanded to the notification page, and
    wherein the notification data included on the notification page comprises an image, an icon, or a text indicating a plurality of application programs stored in the memory and a counter of the information associated with each of the plurality of application programs being displayed in the notification page.

11. The electronic device of claim 10, wherein the touch screen is substantially a rectangle, the rectangle including a first periphery and a second periphery shorter than the first periphery, and the plurality of objects are arranged along the first periphery.

12. The electronic device of claim 10, wherein the touch screen includes a flat part and a curved part extended from the flat part, and the plurality of objects are arranged on the curved part.

13. The electronic device of claim 10, wherein the processor is further configured to control the display to simultaneously display an image and information in the notification page, the image being stored within a memory, and the information being associated with contact information of the registered contact.

14. The electronic device of claim 13, wherein the processor is further configured to control the display to display at least one of an image, an icon, or a text indicating at least one of application programs stored in the memory and a counter of the information associated with each of the application programs in at least one of the notification page.

15. The electronic device of claim 14, wherein the processor is further configured to control the display to display at least one of an image, an icon, or a text indicating a second application program among the application programs stored in the memory or a counter of the information associated with with the second application program in response to a second user input, received through the at least one of the notification page.

16. The electronic device of claim 10, wherein the each of the plurality of objects have different colors or shapes.

17. The electronic device of claim 10, wherein the first user input is a gesture input on the touch screen.

18. The electronic device of claim 10, wherein the processor is further configured to control the display to display an icon or a user interface of at least one application program stored in the memory in another area of the touch screen simultaneously with the the plurality of objects.

* * * * *